US012738980B2

(12) United States Patent
Sahraei et al.

(10) Patent No.: US 12,738,980 B2
(45) Date of Patent: Sep. 15, 2026

(54) INITIAL ACCESS FOR RECONFIGURABLE INTELLIGENT SURFACE ASSISTED COMMUNICATION IN THE ABSENCE OF RECIPROCITY

(71) Applicant: QUALCOMM Incorporated, San Diego, CA (US)

(72) Inventors: Saeid Sahraei, San Diego, CA (US); Yu Zhang, San Diego, CA (US); Hung Dinh Ly, San Diego, CA (US); Krishna Kiran Mukkavilli, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 528 days.

(21) Appl. No.: 18/254,303

(22) PCT Filed: Jan. 13, 2021

(86) PCT No.: PCT/CN2021/071410

§ 371 (c)(1),
(2) Date: May 24, 2023

(87) PCT Pub. No.: WO2022/151016

PCT Pub. Date: Jul. 21, 2022

(65) Prior Publication Data

US 2024/0015797 A1 Jan. 11, 2024

(51) Int. Cl.
*H04B 7/04* (2017.01)
*H04B 7/06* (2006.01)
(Continued)

(52) U.S. Cl.
CPC ..... *H04B 7/04013* (2023.05); *H04B 7/06952* (2023.05); *H04W 48/16* (2013.01); *H04W 74/0833* (2013.01)

(58) Field of Classification Search
CPC ............ H04B 7/04013; H04B 7/06952; H04B 7/088; H04W 48/16; H04W 74/0833;
(Continued)

(56) References Cited

U.S. PATENT DOCUMENTS

2018/0376511 A1* 12/2018 Tsai .................. H04W 74/0833
2020/0145080 A1* 5/2020 Tang .................. H04B 7/06966
(Continued)

FOREIGN PATENT DOCUMENTS

WO WO-2024105647 A1 * 5/2024 ......... H04B 7/04013

OTHER PUBLICATIONS

Basit S.M., et al., "Grant-Free Non-Orthogonal Multiple Access for IoT: A Survey", IEEE Communications Surveys & Tutorials, IEEE, USA, vol. 22, No. 3, May 19, 2020 (May 19, 2020), pp. 1805-1838, XP011807028, 34 Pages, DOI: 10.1109/COMST.2020.2996032 [Retrieved on Aug. 20, 2020] p. 1809 , paragraph B figure 7 p. 1830, paragraph 4.

(Continued)

*Primary Examiner* — Harry H Kim
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station and via a reconfigurable intelligent surface (RIS), a synchronization signal block (SSB) corresponding to a first SSB type configured for RIS-assisted procedures. The UE may select a random access channel (RACH) occasion including multiple physical random access channel (PRACH) transmission slots based at least in part on receiving the SSB corresponding to the first SSB type. The UE may transmit, to the base station, a PRACH communication in the multiple PRACH transmission slots of the RACH occasion. Numerous other aspects are described.

28 Claims, 14 Drawing Sheets

(51) Int. Cl.

| | |
|---|---|
| ***H04B 7/08*** | (2006.01) |
| ***H04W 48/08*** | (2009.01) |
| ***H04W 48/16*** | (2009.01) |
| ***H04W 72/044*** | (2023.01) |
| ***H04W 72/0446*** | (2023.01) |
| ***H04W 74/00*** | (2009.01) |
| ***H04W 74/0833*** | (2024.01) |

(58) Field of Classification Search

CPC ............... H04W 48/08; H04W 74/004; H04W 72/0446; H04W 72/046

See application file for complete search history.

(56) References Cited

U.S. PATENT DOCUMENTS

| | | | | |
|---|---|---|---|---|
| 2023/0189343 | A1* | 6/2023 | Rao | H04L 5/0023 370/329 |
| 2023/0254908 | A1* | 8/2023 | Park | H04W 74/006 370/329 |
| 2023/0292364 | A1* | 9/2023 | Mu | H04W 72/23 |
| 2023/0308139 | A1* | 9/2023 | Baligh | H04B 7/04013 |
| 2023/0308140 | A1* | 9/2023 | Baligh | H04B 7/04013 |
| 2023/0309150 | A1* | 9/2023 | Hakola | H04W 72/046 |
| 2024/0057149 | A1* | 2/2024 | Pan | H04W 74/002 |
| 2024/0107477 | A1* | 3/2024 | Jeon | H04B 7/0695 |
| 2024/0188082 | A1* | 6/2024 | Agiwal | H04B 7/0617 |
| 2025/0151033 | A1* | 5/2025 | Cirik | H04W 72/044 |
| 2025/0212248 | A1* | 6/2025 | Gao | H04W 74/002 |

OTHER PUBLICATIONS

International Search Report and Written Opinion—PCT/CN2021/071410—ISA/EPO—Jul. 2, 2021.

Renzo M.D., et al., "Smart Radio Environments Empowered by Reconfigurable Intelligent Surfaces: How It Works, State of Research and The Road Ahead", IEEE Journal on Selected Areas in Communications, IEEE Service Center, Piscataway, US, vol. 38, No. 11, Jul. 14, 2020, XP011815060, pp. 2450-2525, ISSN: 0733-8716, DOI: 10.1109/JSAC.2020.3007211, the whole document.

* cited by examiner

500

800

900

1200

INITIAL ACCESS FOR RECONFIGURABLE INTELLIGENT SURFACE ASSISTED COMMUNICATION IN THE ABSENCE OF RECIPROCITY

CROSS-REFERENCE TO RELATED APPLICATION

This Patent Application is a 371 national stage of PCT Application No. PCT/CN2021/071410 filed on Jan. 13, 2021, entitled "INITIAL ACCESS FOR RECONFIGURABLE INTELLIGENT SURFACE ASSISTED COMMUNICATION IN THE ABSENCE OF RECIPROCITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for initial access for reconfigurable intelligent surface assisted communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
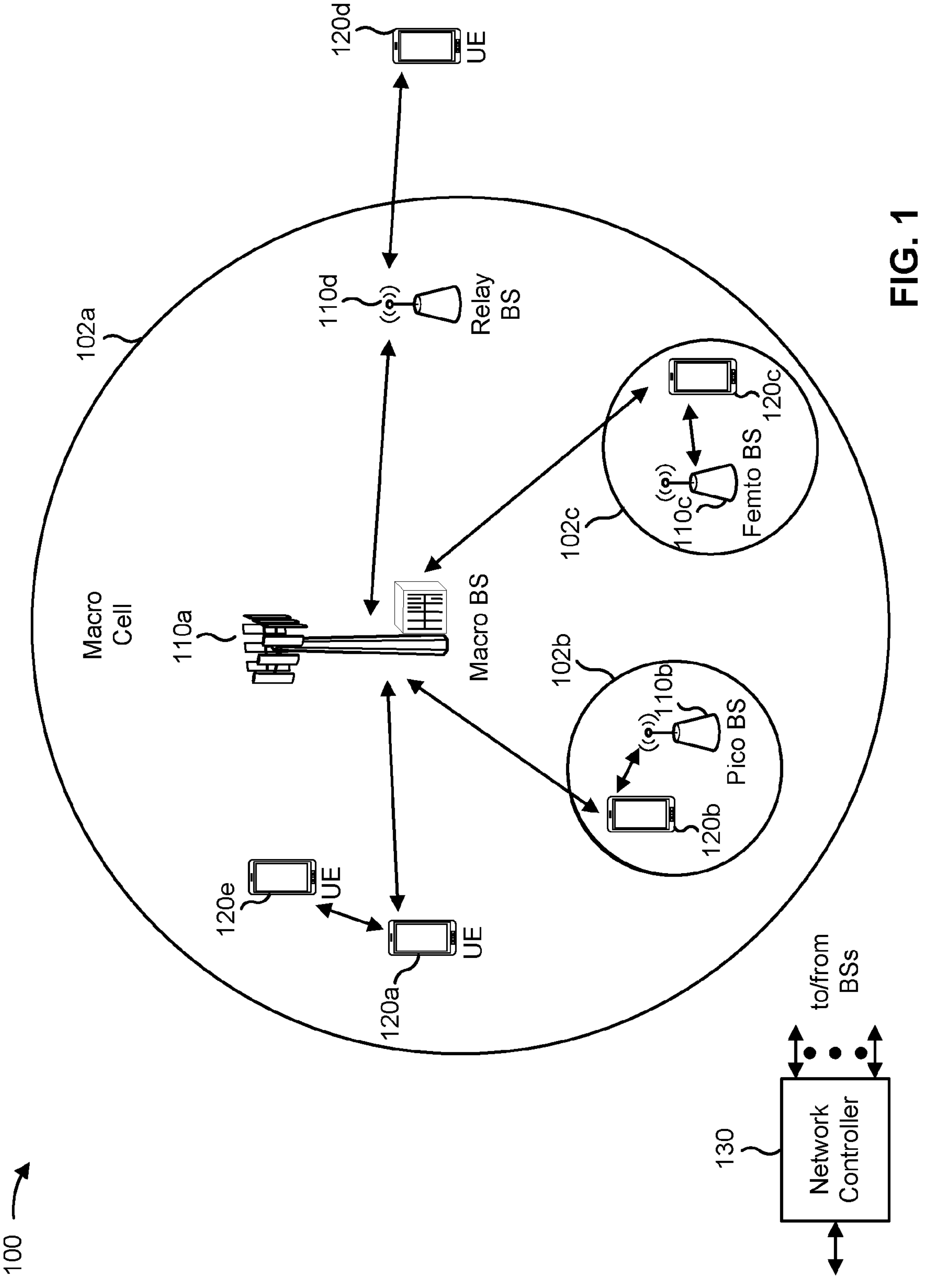
FIG. 1 is a diagram illustrating an example of a wireless network, in accordance with various aspects of the present disclosure.

In some aspects, a method of wireless communication performed by a UE includes receiving, from a base station and via a reconfigurable intelligent surface (RIS), a synchronization signal block (SSB) corresponding to a first SSB type configured for RIS-assisted procedures; selecting a random access channel (RACH) occasion including multiple physical random access channel (PRACH) transmission slots based at least in part on receiving the SSB corresponding to the first SSB type; and transmitting, to the base station, a PRACH communication in the multiple PRACH transmission slots of the RACH occasion.

In some aspects, a method of wireless communication performed by abase station includes transmitting, on a first transmit beam of the base station, multiple transmissions of a SSB corresponding to a first SSB type configured for RIS-assisted procedures; performing beam sweeping using multiple receive beams of the base station over multiple PRACH transmission slots of a RACH occasion associated with the SSB; and selecting, from the multiple receive beams of the base station, a first receive beam for receiving uplink communications from a UE based on receiving, from the UE and via a RIS, a PRACH communication on the first receive beam during the beam sweeping.

In some aspects, a UE for wireless communication includes a memory; and one or more processors operatively coupled to the memory, the memory and the one or more processors configured to: receive, from a base station and via a RIS, a SSB corresponding to a first SSB type configured for RIS-assisted procedures; select a RACH occasion including multiple PRACH transmission slots based at least in part on receiving the SSB corresponding to the first SSB type; and transmit, to the base station, a PRACH communication in the multiple PRACH transmission slots of the RACH occasion.

In some aspects, a base station for wireless communication includes a memory; and one or more processors operatively coupled to the memory, the memory and the one or more processors configured to: transmit, on a first transmit beam of the base station, multiple transmissions of a SSB corresponding to a first SSB type configured for RIS-assisted procedures; perform beam sweeping using multiple receive beams of the base station over multiple PRACH transmission slots of a RACH occasion associated with the SSB; and select, from the multiple receive beams of the base station, a first receive beam for receiving uplink communications from a UE based on receiving, from the UE and via a RIS, a PRACH communication on the first receive beam during the beam sweeping.

In some aspects, a non-transitory computer-readable medium storing a set of instructions for wireless communication includes one or more instructions that, when executed by one or more processors of a UE, cause the UE to: receive, from a base station and via a RIS, a SSB corresponding to a first SSB type configured for RIS-assisted procedures; select a RACH occasion including multiple PRACH transmission slots based at least in part on receiving the SSB corresponding to the first SSB type; and transmit, to the base station, a PRACH communication in the multiple PRACH transmission slots of the RACH occasion.

In some aspects, a non-transitory computer-readable medium storing a set of instructions for wireless communication includes one or more instructions that, when executed by one or more processors of a base station, cause the base station to: transmit, on a first transmit beam of the base station, multiple transmissions of a SSB corresponding to a first SSB type configured for RIS-assisted procedures; perform beam sweeping using multiple receive beams of the base station over multiple PRACH transmission slots of a RACH occasion associated with the SSB; and select, from the multiple receive beams of the base station, a first receive beam for receiving uplink communications from a UE based on receiving, from the UE and via a RIS, a PRACH communication on the first receive beam during the beam sweeping.

In some aspects, an apparatus for wireless communication includes means for receiving, from a base station and via a RIS, a SSB corresponding to a first SSB type configured for RIS-assisted procedures; means for selecting a RACH occasion including multiple PRACH transmission slots based at least in part on receiving the SSB corresponding to the first SSB type; and means for transmitting, to the base station, a PRACH communication in the multiple PRACH transmission slots of the RACH occasion.

In some aspects, an apparatus for wireless communication includes means for transmitting, on a first transmit beam of the base station, multiple transmissions of a SSB corresponding to a first SSB type configured for RIS-assisted procedures; means for performing beam sweeping using multiple receive beams of the base station over multiple PRACH transmission slots of a RACH occasion associated with the SSB; and means for selecting, from the multiple receive beams of the base station, a first receive beam for receiving uplink communications from a UE based on receiving, from the UE and via a RIS, a PRACH communication on the first receive beam during the beam sweeping.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station". "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz. and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a “sub-6 GHz” band. Similarly, FR2 is often referred to as a “millimeter wave” band despite being different from the extremely high frequency (EHF) band (30 GHz-300 GHz) which is identified by the International Telecommunications Union (ITU) as a “millimeter wave” band. Thus, unless specifically stated otherwise, it should be understood that the term “sub-6 GHz” or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term “millimeter wave” or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
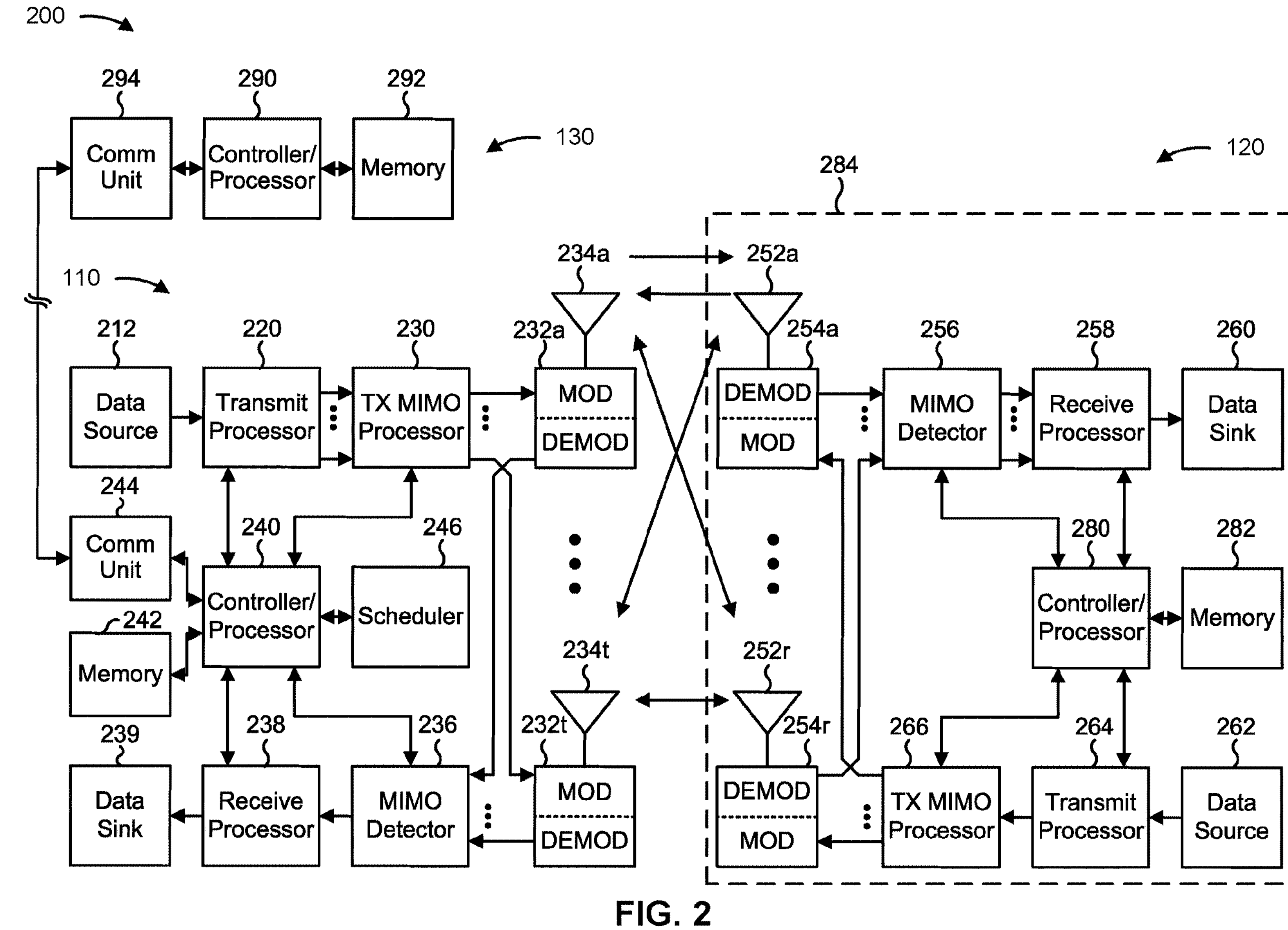
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM)) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 10-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 10-12.

Controller/processor 240 of base station 110, controller/processor 280 of UE 120, and/or any other component(s) of FIG. 2 may perform one or more techniques associated with initial access for reconfigurable intelligent surface (RIS)-assisted communication, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 12 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for receiving, from a base station and via a reconfigurable intelligent surface (RIS), a synchronization signal block (SSB) corresponding to a first SSB type configured for RIS-assisted procedures; means for selecting a random access channel (RACH) occasion including multiple physical random access channel (PRACH) transmission slots based at least in part on receiving the SSB corresponding to the first SSB type; or means for transmitting, to the base station, a PRACH communication in the multiple PRACH transmission slots of the RACH occasion. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting the PRACH communication in the multiple PRACH transmission slots of the RACH occasion on a transmit beam of the UE that corresponds to the receive beam of the UE that received the SSB.

In some aspects, the UE 120 includes means for transmitting, in the multiple PRACH transmission slots of the RACH occasion, the PRACH communication multiple times on each transmit beam of a plurality of transmit beams of the UE.

In some aspects, the UE 120 includes means for selecting, from the plurality of transmit beams of the UE, a transmit beam for transmitting an uplink communication to the base station based at least in part on a determination of which transmit beam transmits the PRACH communication that is received by the base station.

In some aspects, the UE 120 includes means for selecting, based at least in part on receiving the SSB corresponding to the first SSB type, a PRACH preamble that indicates a transmit beam of the base station used to transmit the SSB received by the UE and a beam from the RIS that reflected the SSB received by the UE, wherein the PRACH communication includes the PRACH preamble.

In some aspects, the UE 120 includes means for selecting the RACH occasion to correspond to a transmit beam of the base station used to transmit the SSB received by the UE and a beam from the RIS that reflected the SSB received by the UE.

In some aspects, the UE 120 includes means for selecting the RACH occasion based at least in part on a mapping between RACH occasions and SSB types.

In some aspects, the UE 120 includes means for selecting the RACH occasion from the first set of RACH occasions.

In some aspects, the base station 110 includes means for transmitting, on a first transmit beam of the base station, multiple transmissions of an SSB corresponding to a first SSB type configured for RIS-assisted procedures; means for performing beam sweeping using multiple receive beams of the base station over multiple PRACH transmission slots of a RACH occasion associated with the SSB; or means for selecting, from the multiple receive beams of the base station, a first receive beam for receiving uplink communications from a UE based on receiving, from the UE and via a RIS, a PRACH communication on the first receive beam during the beam sweeping. The means for the base station to perform operations described herein may include, for example, one or more of transmit processor 220. TX MIMO processor 230, modulator 232, antenna 234, demodulator 232, MIMO detector 236, receive processor 238, controller/processor 240, memory 242, or scheduler 246.

In some aspects, the base station 110 includes means for transmitting the multiple transmissions of the SSB on the first transmit beam toward the RIS, wherein each of the multiple transmissions of the SSB on the first transmit beam is to be reflected by the RIS using a different beam.

In some aspects, the base station 110 includes means for transmitting, on each of the first transmit beam and one or more other transmit beams of the base station, multiple transmissions of the SSB corresponding to the first SSB type.

In some aspects, the base station 110 includes means for monitoring each of the multiple PRACH transmission slots using a respective receive beam of the multiple receive beams base station to determine whether the PRACH communication is received on the respective receive beam.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
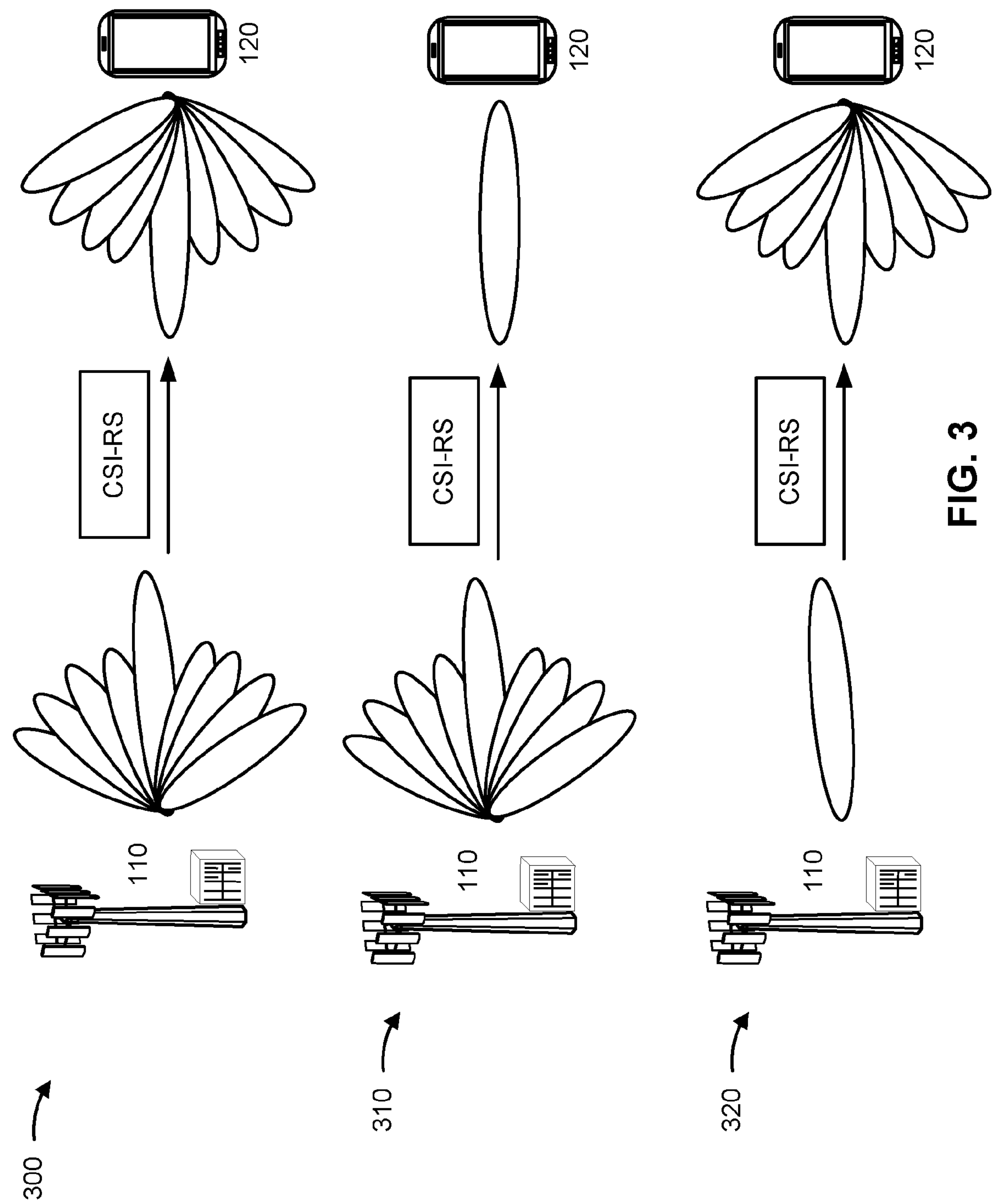
FIG. 3 is a diagram illustrating examples of beam management procedures, in accordance with various aspects of the present disclosure.

FIG. 3 is a diagram illustrating examples 300, 310, and 320 of beam management procedures, in accordance with various aspects of the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include abase station 110 and a UE 120 communicating to perform beam management using channel state information (CSI) reference signals (CSI-RSs). Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use SSBs for beam management in a similar manner as described above.

As shown in FIG. 3, example 310 may include abase station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, the UE 120 and the base station 110 may perform a similar beam management procedure to select a UE transmit beam, and/or the like.

Figure 4:
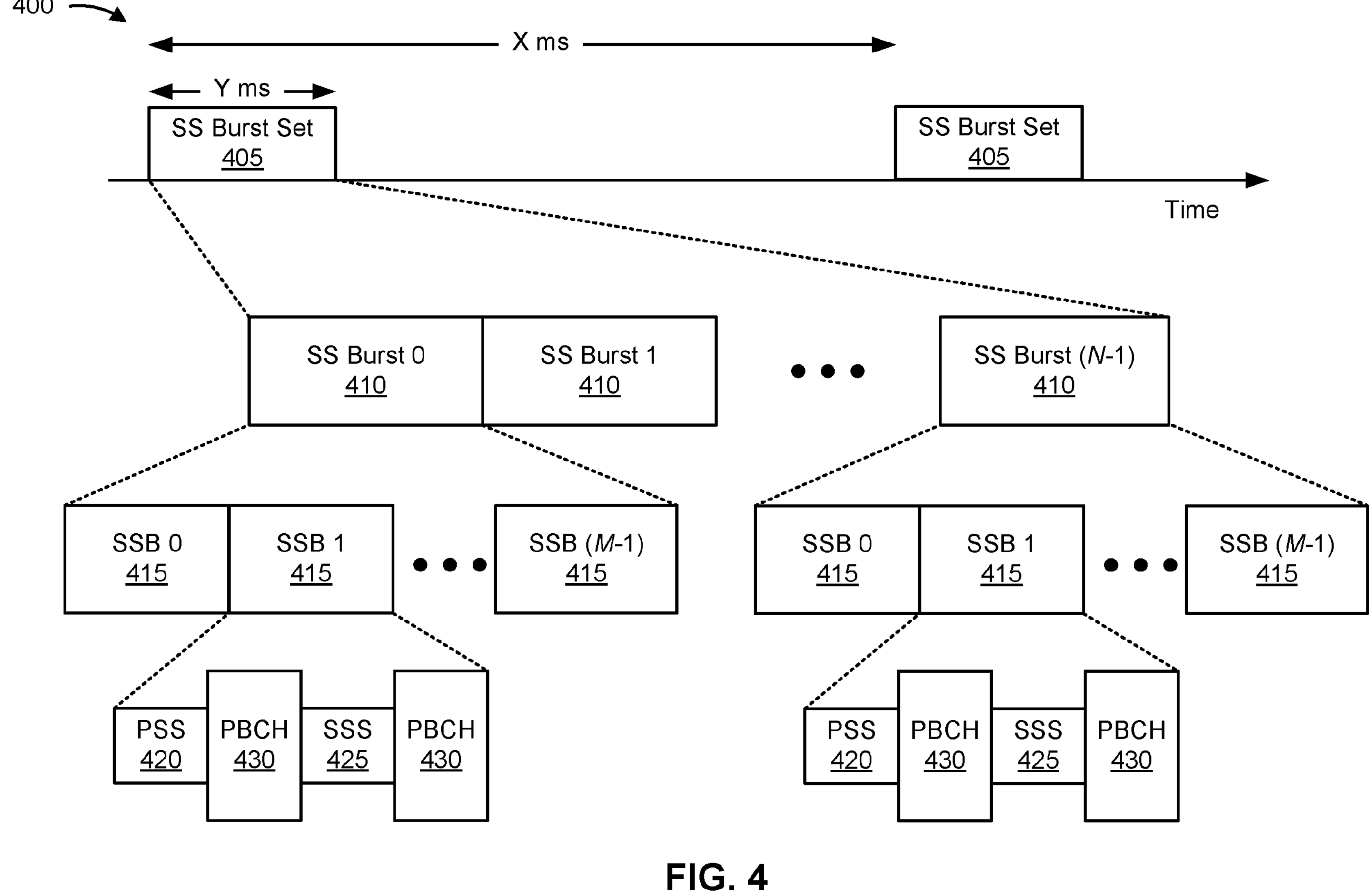
FIG. 4 is a diagram illustrating an example of a synchronization signal (SS) hierarchy, in accordance with various aspects of the present disclosure.

FIG. 4 is a diagram illustrating an example 400 of a synchronization signal (SS) hierarchy, in accordance with various aspects of the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, beam selection, and/or the like (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a primary synchronization signal (PSS) 420, a secondary synchronization signal (SSS) 425, a physical broadcast channel (PBCH) 430, and/or the like. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a RSRP parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally. or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
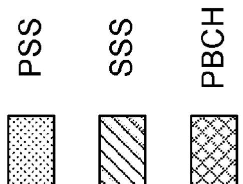
FIG. 5 is a diagram illustrating an example of a synchronization signal block (SSB), in accordance with various aspects of the present disclosure.
Figure 5:
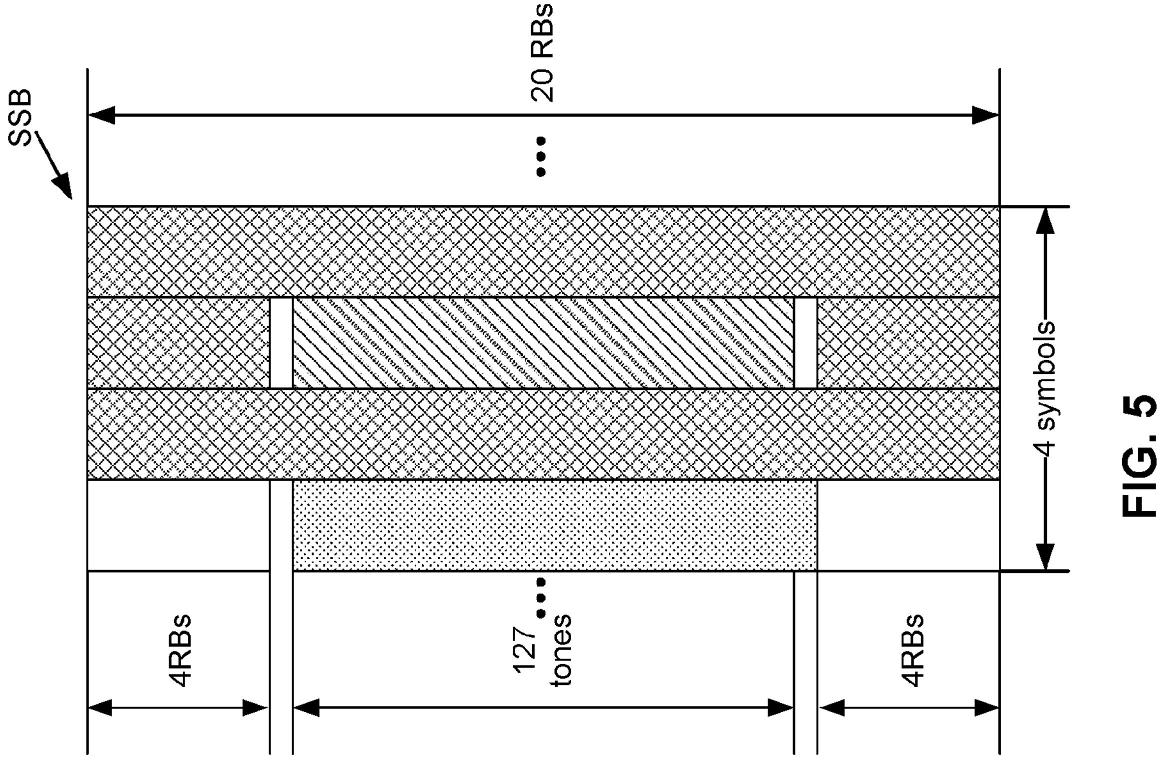

FIG. 5 is a diagram illustrating an example 500 of an SSB, in accordance with various aspects of the present disclosure. The SSB shown in example 500 may be an SSB transmitted by a base station 110 with one or more other SSBs in a SS burst, as described above in connection with FIG. 4.

The base station 110 may transmit one or more SSBs using multiple beams in a time division multiplexing (TDM) scheme. Additionally. or alternatively, base station 110 may transmit the one or more SSBs using multiple beams in a frequency-division multiplexing (FDM) scheme. For example, the one or more SSBs may be transmitted according to a synchronization raster. The synchronization raster may indicate time and frequency resources reserved for the transmission of SSBs that may be used by a UE 120 for synchronizing with the base station 110. The UE 120 may scan a frequency band according to the synchronization raster when performing a cell search. In some aspects, the UE 120 may receive one or more SSBs from the base station 110. Additionally, or alternatively, the UE 120 may receive one or more SSBs from multiple base stations 110. The UE 120 may acquire downlink synchronization information and/or system information based on the received one or more SSBs. In some aspects, the UE 120 may be located within a certain downlink beam of the base station 110, and, as a result, may receive one SSB from the base station 110. That is, the UE 120 may be unaware of the transmission of other SSBs within a cell associated with the base station 110.

An SSB may have different patterns or structures depending on parameters such as subcarrier spacing (SCS) for both SSB symbols and data symbols and a frequency range, among other examples. For example, as shown in FIG. 5, the SSB may occupy 4 OFDM symbols in the time domain and 240 tones/subcarriers (20 resource blocks) in the frequency domain. Within the SSB, the PSS may occupy 127 tones/ subcarriers (12 resource blocks) of the first OFDM symbol of the SSB. The SSS may occupy 127 tones/subcarriers (12 resource blocks) of the third OFDM symbol of the SSB. The PBCH may fully occupy (20 resource blocks) of the second and fourth OFDM symbols and occupy a total of 96 tones/subcarriers (8 resource blocks) above and below the SSS in the third OFDM symbol. The UE 120 may use the PSS to determine subframe/symbol timing of the base station 110 and to determine a physical layer identity. The UE 120 may use the SSS to determine a physical layer cell identity group number and radio frame timing. The PBCH may include PBCH demodulation reference signals (PBCH DMRS) and PBCH data signals. Furthermore, the PBCH may carry a master information block (MIB). The MIB may provide a number of resource blocks (RBs) in the system bandwidth and a system frame number (SFN).

As indicated above, FIG. 5 is provided as an example. Other examples may differ from what is described with respect to FIG. 5.

Figure 6:
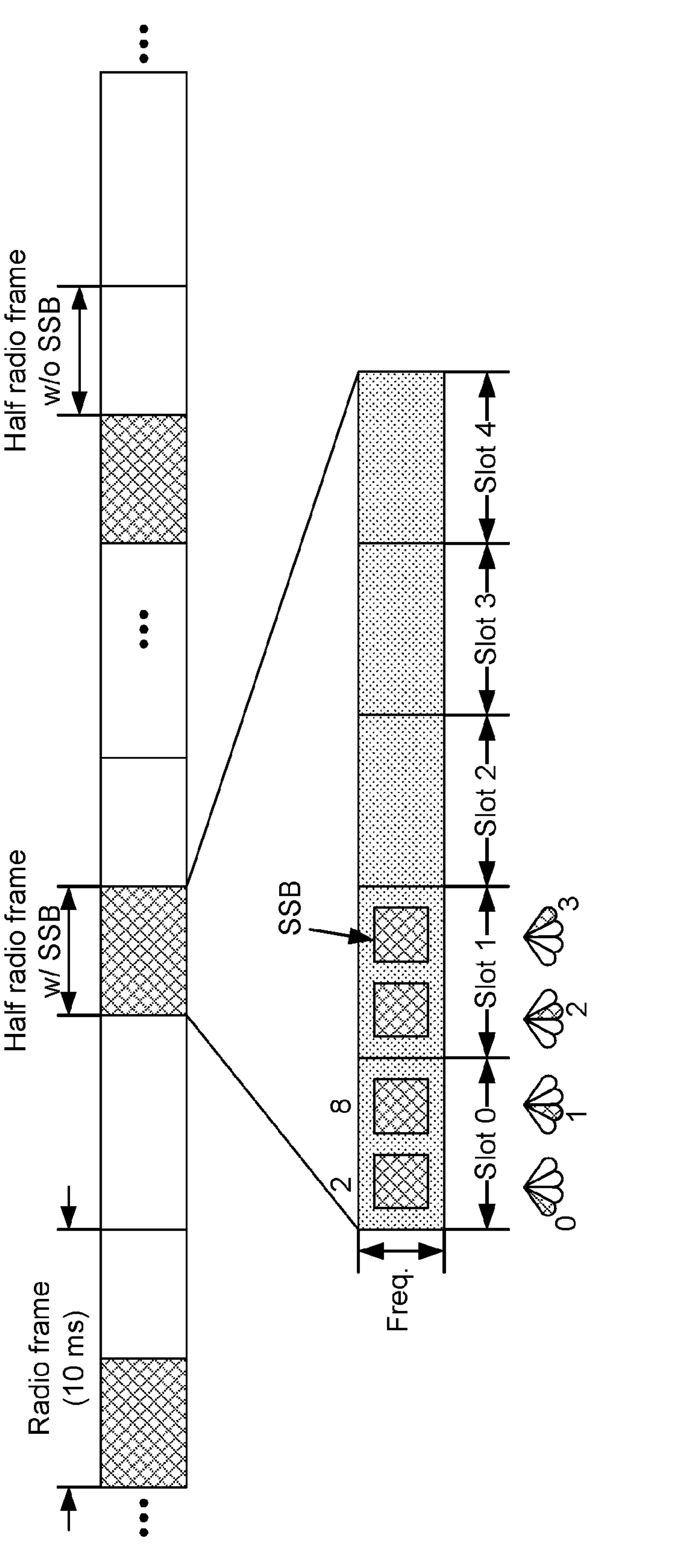
FIG. 6 is a diagram illustrating an example of resources for SSB transmissions, in accordance with various aspects of the present disclosure.

FIG. 6 is a diagram illustrating an example 600 of resources for SSB transmissions, in accordance with various aspects of the present disclosure.

As shown in FIG. 6, a frame (e.g., 10 milliseconds) may be divided into two equally sized half radio frames (e.g., 5 milliseconds). Each half radio frame may include or more time slots. A base station 110 may transmit synchronization bursts during one of the two half radio frames of each frame according to the synchronization raster. For example, the base station 110 may transmit a first SSB starting at OFDM symbol 2 of slot 0 of the half radio frame, a second SSB starting at OFDM symbol 8 of slot 0 of the half radio frame, a third SSB starting at OFDM symbol 2 of slot 1 of the half radio frame, and a fourth SSB starting at OFDM symbol 8 of slot 1 of the half radio frame.

Additionally, or alternatively, the base station 110 may transmit each SSB using a corresponding Tx beam in order to cover a spatial area with each synchronization burst. For example, the base station 110 may transmit the first SSB using Tx beam 0 to direct the resulting signal in a first direction, the second SSB using Tx beam 1 to direct the resulting signal in a second direction, the third SSB using Tx beam 2 to direct the resulting signal in a third direction, and the fourth SSB using Tx beam 3 to direct the resulting signal in a fourth direction. The base station 110 may transmit each Tx beam using a corresponding spatial filter.

As indicated above, FIG. 6 is provided as an example. Other examples may differ from what is described with respect to FIG. 6.

Figure 7:
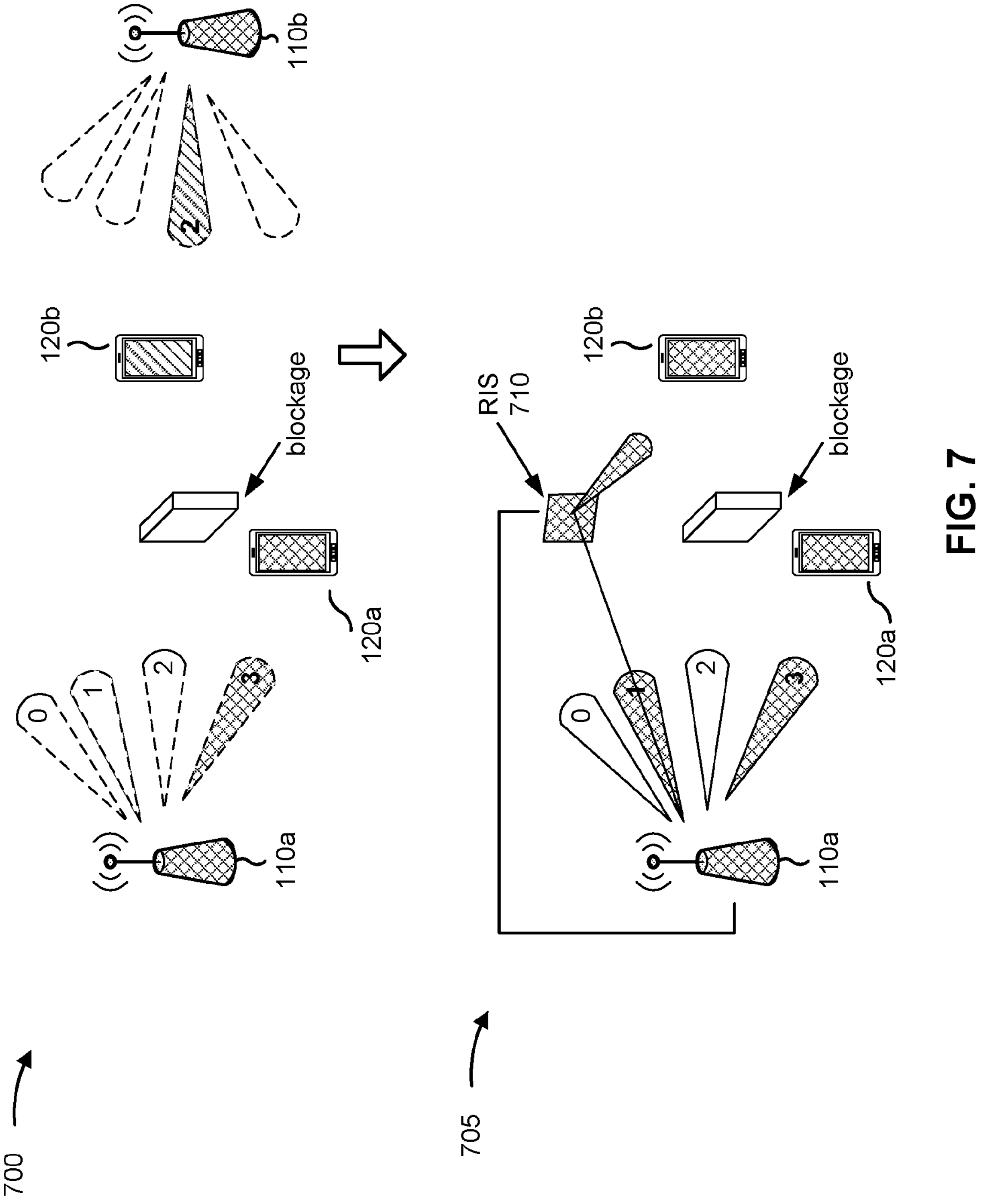
FIG. 7 is a diagram illustrating examples of wireless communication systems with a blockage between a base station and a UE, in accordance with various aspects of the present disclosure.

FIG. 7 is a diagram illustrating examples 700 and 705 of wireless communication systems with a blockage between a base station and a UE, in accordance with various aspects of the present disclosure.

As shown in example 700, the wireless communication system may include base stations 110 and UEs 120. As described above in connection with FIG. 2, the base stations 110 may use MIMO antenna technology and spatial processing. In some cases, the base stations 110 may attempt to increase throughput by employing active antenna units (AAU) to increase a beamforming gain of the antenna elements in the base stations 110. For example, a first base station 110*a* may use AAU to focus transmitted energy into a spatially-filtered Tx beam directed towards a first UE 120*a*. However, the AAU may require that an individual radio frequency (RF) chain be implemented for each antenna port. In such an implementation, the use of AAU may result in a significant increase in power consumption as each RF actively transmits and receives signals.

Additionally, the use of AAU and beamforming techniques may not be sufficient to provide service to all of the UEs 120 in a coverage area of a base station 110. For example, as shown in example 700, a blockage may exist that may prevent the first base station 110*a* from communicating with a second UE 120*b*. The blockage may be an artificial structure (e.g., a high-rise building, a bridge, etc.) or may be a natural feature of the terrain (e.g., a mountain, a change in elevation, etc.). As shown in example 700, in cases of a blockage, an operator may install a second base station 110*b* (e.g., relay base station, macro base station, femto base station, or pico base station) to provide service coverage to a region experiencing the blockage (i.e., coverage hole). That is, the second base station 110*b* may communicate with and provide service to the second UE 120*b*. However, such an approach may add complexity to the wireless communication system and increase costs due to the duplication of active communication equipment. Furthermore, adding a base station to the wireless communication system may increase power consumption requirements of the wireless communication system.

As shown in example 705, in some aspects, a wireless communication system may include a first base stations 110*a*. UEs 120, and an RIS 710. The RIS 710 may include a passive surface that may be dynamically configured to manipulate incident electromagnetic waves to change channel conditions. That is, the RIS 710 may be a passive device that may be configured to reflect impinging waves in a certain direction without injecting additional power to the reflected waves. The base station 110 may configure the RIS 710 to control the reflection direction of waves transmitted to the RIS 710. As shown in example 705, the first base station 110*a* may use the RIS 710 to create a propagation path that avoids the blockage in order to establish a communication channel between the first base station 110*a* and the second UE 120*b*. The first base station 110*a* may create the propagation path by dynamically controlling one or more of scattering, reflection, and refraction characteristics of the RIS 710 to redirect a signal transmitted on a Tx beam of the first base station 110*a* to the second UE 120*b*. In this case, the first base station 110*a* may use the 710 to communicate with the second UE 120*b* without the need for the second base station 110*b* shown in example 700. The RIS 710 does not amplify the power of the waves reflected by the RIS 710, and therefore, consumes significantly less power than an additional base station or relay device. Thus, RIS-assisted communication between a base station and a UE may reduce power consumption and/or complexity of the wireless communication system.

As indicated above, FIG. 7 is provided as an example. Other examples may differ from what is described with respect to FIG. 7.

Figure 8:
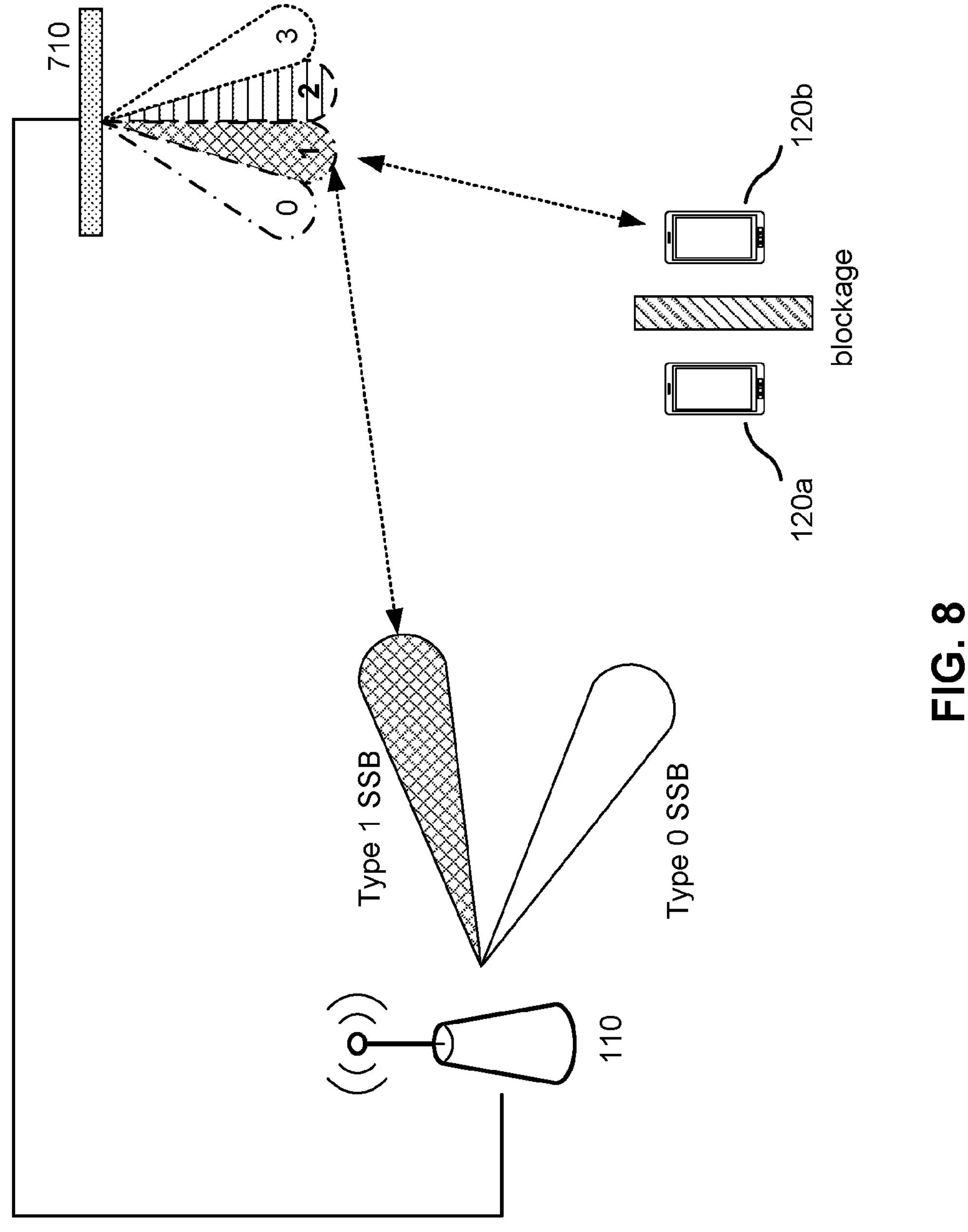
FIG. 8 is a diagram illustrating an example of SSB transmission in a wireless communication system with a reconfigurable intelligent surface (RIS), in accordance with various aspects of the present disclosure.

FIG. 8 is a diagram illustrating an example 800 of SSB transmission in a wireless communication system with a RIS, in accordance with various aspects of the present disclosure. As shown in FIG. 8, in example 800, the wireless communication system may include a base station 110, a first UE 120*a*, second UE 102*b*, and a RIS 710.

As shown in FIG. 8, the base station 110 may transmit a type 0 SSB, and the first UE 120*a* may receive the type 0 SSB. The base station 110 may periodically transmit SS bursts including type 0 SSBs ("legacy" SSBs) for conventional (or "legacy") channel training procedures for non-RIS-assisted communication between the base station and a UE (e.g., the first UE 120*a*). In some aspects, the base station 110 may transmit each type 0 SSB of the SS burst using a corresponding Tx beam. For example, the base station 110 may transmit each Tx beam using a corresponding spatial filter to transmit the corresponding type 0 SSB in a distinct direction of a spatial coverage area of the base station 110. In this case, the SS burst of type 0 SSBs may result in providing initial access using the conventional channel training procedure to at least a portion of the spatial coverage area of the base station 110.

The first UE 120*a* may receive the type 0 SSB on an Rx beam, for example, using Rx beam sweeping and transmit a PRACH communication to the base station 110 to initiate a RACH procedure. In this case, beam correspondence may be maintained between the base station 110 and the first UE 120*a*. That is, the first UE 120*a* may transmit the PRACH communication using a Tx beam that corresponds to the Rx beam on which the first UE 120*a* received the SSB, and the base station 110 may receive the PRACH communication using an Rx beam that corresponds to the Tx beam used to transmit the SSB received by the first UE 120. As used herein, a Tx beam and Rx beam of a device (e.g., base station or UE) correspond to each other when they correspond to the same direction or spatial filter of the device.

In some aspects, the base station 110 may periodically transmit SS bursts including type 1 SSBs. Type 1 SSBs are SSBs configured for RIS-assisted channel training procedures (e.g. RIS-assisted initial access procedures). For example, RIS-assisted procedures may include channel training procedures to establish a communication channel between the base station 110 and a UE (e.g., the second UE 120*b*) using the RIS 710 to create the propagation path between the base station 110 and the UE (e.g., the second UE 120*b*). The type 1 SSB may include a PSS, an SSS and a PBCH. In some aspects, the type 1 SSB may be distinguishable from the type 0 SSB by transmitting the type 1 SSB over a separate synchronization frequency associated with the type 1 SSB. In some aspects, the type 1 SSB may be distinguishable from the type 0 SSB by an indication included in the type 1 SSB, such as an indication in the SSS of the type 1 SSB or indication in the PBCH of the type 1 SSB.

In some aspects, the base station 110 may transmit multiple type 1 SSBs of the SS burst using different Tx beams. For example, the base station 110 may transmit each Tx beam using a corresponding spatial filter to transmit a corresponding type 1 SSB in a distinct direction of the spatial coverage area of the base station 110. In this case, the synchronization burst of type 1 SSBs may result in providing service coverage to at least a portion of the spatial coverage area of the base station 110.

Additionally, or alternatively, the base station 110 may transmit multiple type 1 SSBs of the SS burst using the same Tx beam. For example, the base station 110 may transmit multiple type 1 SSBs using a Tx beam transmitted in a direction associated with the RIS 710. In this case, the base station 110 may control propagation characteristics of the RIS 710 to ensure that the type 1 SSBs are reflected from the RIS 710 on distinct beams corresponding to distinct directions of a spatial coverage area of the RIS 710. For example, as shown in FIG. 8, the base station 110 may transmit a first type 1 SSB on a Tx beam directed towards the RIS 710. The base station 110 may control a configuration of the RIS 710 such that the first type 1 SSB is reflected from the RIS 710 on a first beam (beam 0) in a first direction. The base station 110 may further transmit a second type 1 SSB in on the Tx beam directed towards the RIS 710. The base station 110 may control the configuration of the RIS 710 such that the second type 1 SSB is reflected from the RIS 710 on a second beam (beam 1) in a second direction. The base station 110 may further transmit a third type 1 SSB in on the Tx beam directed towards the RIS 710. The base station 110 may control the configuration of the RIS 710 such that the third type 1 SSB is reflected from the RIS 710 on a third beam (beam 2) in a third direction. The base station 110 may further transmit a fourth type 1 SSB in on the Tx beam directed towards the RIS 710. The base station 110 may control the configuration of the RIS 710 such that the fourth type 1 SSB is reflected from the RIS 710 on a fourth beam (beam 3) in a fourth direction. The reflection directions associated with the beams from the RIS 710 may be configured to provide service coverage to at least a portion of the spatial coverage area of the base station 110 reachable by the RIS 710. For example, the reflection directions of the RIS 710 may be configured to provide service coverage for a portion of the spatial coverage area of the base station 110 otherwise unreachable by the base station 110 due to a blockage.

As shown in FIG. 8, the second UE 120*b* may receive the type 1 SSB, transmitted by the base station 110, via one or more beams reflected from the RIS 710. For example, the second UE 120*b* may receive the type 1 SSB reflected on the second beam (beam 1) from the RIS 710. The second UE 120*b*, based at least in part on receiving the type 1 SSB, may initiate a RIS-assisted channel training procedure (e.g., RIS-assisted initial access procedure). In the RIS-assisted channel training procedure, the base station 110 may determine a cascaded channel between the base station 110 and the second UE 120*b* via the RIS 710. The cascaded channel may include the Tx beam used to transmit the type 1 SSB from the base station 110 to the RIS 710, the beam from the RIS 710 on which the type 1 SSB received by the second UE 120*b* was reflected, and the receive beam of the second UE 120*b* used to receive the type 1 SSB.

As indicated above, FIG. 8 is provided as an example. Other examples may differ from what is described with respect to FIG. 8.

Figure 9:
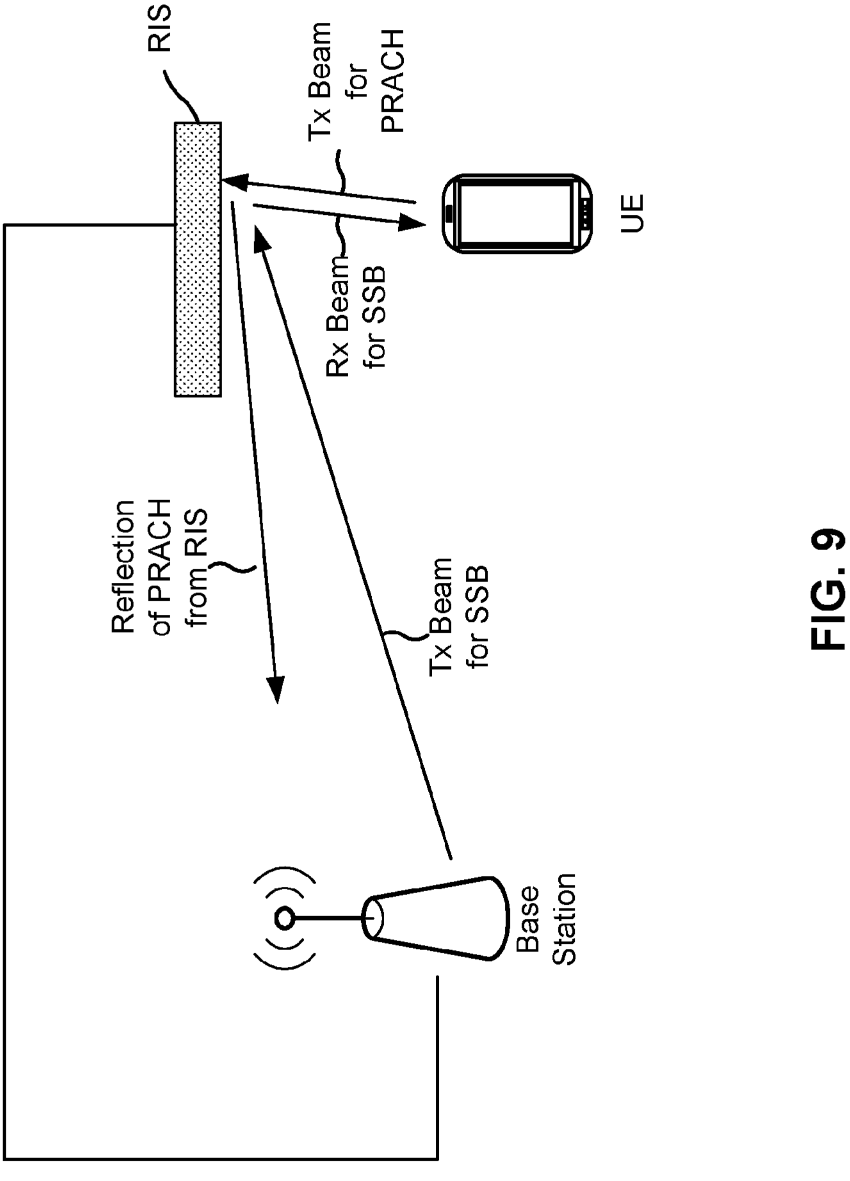
FIG. 9 is a diagram illustrating an example of physical random access channel (PRACH) transmission without reciprocity in a wireless communication system with a RIS, in accordance with various aspects of the present disclosure.

FIG. 9 is a diagram illustrating an example 900 of PRACH transmission without reciprocity in a wireless communication system with a RIS, in accordance with various aspects of the present disclosure.

As shown in FIG. 9, a base station may transmit an SSB (e.g., type 1 SSB) on a Tx beam in a direction associated with a RIS. The RIS may reflect the SSB, and a UE may receive, an Rx beam of the UE. The UE may transmit a PRACH communication toward the RIS on a Tx beam corresponding to the Rx beam on which the UE received the SSB. However, the RIS may operate differently in the uplink direction and the downlink direction. For example, the RIS may have a different relationship between the impinging angle and the reflecting angle in the uplink direction and the downlink direction. Accordingly, there may not be reciprocity between the directions of uplink and downlink signals reflected by the RIS. Thus, as shown in FIG. 9, the PRACH communication, transmitted by the UE, may be reflected from the RIS in a direction such that the base station may not be able to receive the PRACH communication on the Rx beam that corresponds to the Tx beam used by the base station to transmit the SSB.

As described above, beam correspondence is maintained between a base station and a UE in a non-RIS-assisted initial access procedure. That is, the UE may transmit a PRACH communication on a Tx beam that corresponds to the Rx beam on which an SSB is received by the UE, and the base station may receive the PRACH communication on an Rx beam that corresponds to the Tx beam on which the SSB received by the UE is transmitted. However, as shown in FIG. 9, such beam correspondence may not hold in an RIS-assisted initial access procedure. Accordingly, a base station may not receive PRACH communications reflected by an RIS, which may cause initial access for RIS-assisted communication between the base station and a UE to fail. Thus, network coverage using an RIS may be reduced, which may result in increased power consumption and network complexity associated with additional base stations or relay devices.

Some techniques or apparatuses described herein enable initial access for RIS-assisted communication in the absence of reciprocity. In some aspects, a UE may receive, from a base station and via an RIS, an SSB corresponding to a first SSB type configured for RIS-assisted procedures. The UE may select a RACH occasion including multiple PRACH transmission slots based on receiving the SSB corresponding to the first SSB type. The UE may transmit a PRACH communication in the multiple transmission slots, resulting in the UE transmitting multiple PRACH communications. The base station may perform beam sweeping using multiple Rx beams of the base station over the multiple PRACH transmission slots of the RACH occasion. The base station may select, from the multiple receive beams of the base station, a first receive beam for receiving uplink communications from the UE based at least in part on receiving, from the UE and via the RIS, a PRACH communication on the first receive beam during beam sweeping. As a result, the base station may receive the PRACH communication from the UE and allow RIS-assisted initial access, even when beam correspondence does not hold in the uplink and downlink directions. This may increase the reliability of RIS-assisted communications, and thus enable RIS-assisted communications to be used in place of additional base stations and/or relay devices, which may reduce power consumption and network complexity of a wireless communication system.

As indicated above, FIG. 9 is provided as an example. Other examples may differ from what is described with respect to FIG. 9.

Figure 10:
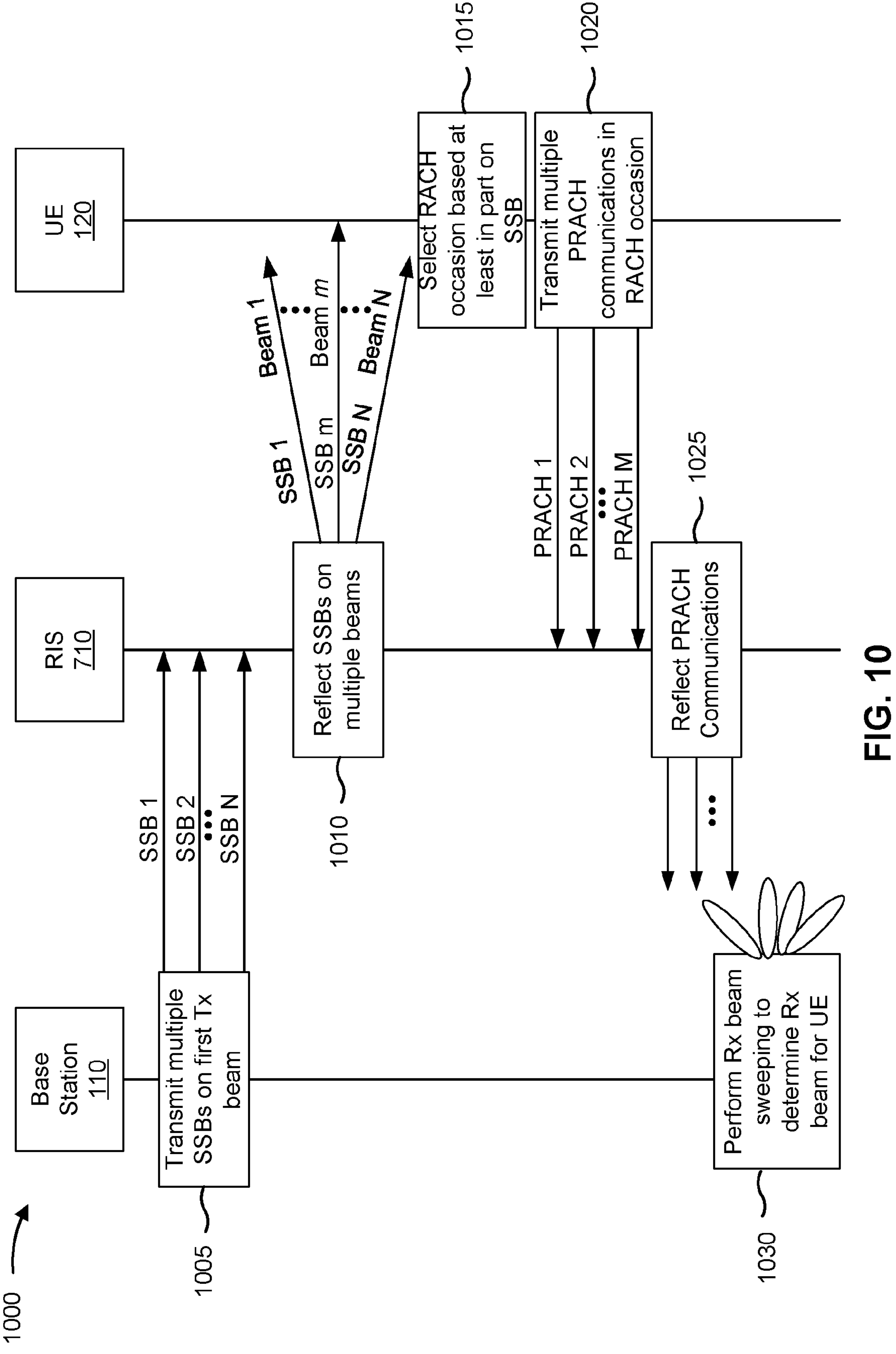
FIG. 10 is a diagram illustrating an example associated with initial access for RIS-assisted communication, in accordance with various aspects of the present disclosure.

FIG. 10 is a diagram illustrating an example 1000 associated with initial access for RIS-assisted communication, in accordance with various aspects of the present disclosure. As shown in FIG. 10, example 1000 includes communication between a base station 110, a UE 120, and a RIS 710. In some aspects, base station 110, UE 120 may be included in a wireless network, such as wireless network 100. The base station 110 and the UE 120 may communicate via a wireless access link, which may include an uplink and a downlink. In some aspects, the base station 110 and the UE 120 may communicate via signals reflected by the RIS 710.

As shown in FIG. 10, and by reference number 1005, the base station 110 may transmit multiple SSBs (e.g., SSB 1, SSB 2, . . . , SSB N) on a first Tx beam of the base station 110. In some aspects, the base station 110 may transmit, in an SSB burst, multiple transmissions of an SSB corresponding to a first type of SSB configured for RIS-assisted procedures. For example, the base station 110 may transmit, on the first Tx beam, multiple type 1 SSBs, as described elsewhere herein.

In some aspects, the base station 110 may transmit N type 1 SSBs on the first TX beam, where N corresponds to a number of beams to be reflected by the RIS 710 in a beam sweeping procedure performed by the RIS 710. In some aspects, the first Tx beam may be a Tx beam transmitted in a direction associated with the RIS 710. For example, the base station 110 may store information indicating that the first transmit beam is transmitted in a direction of the RIS 710, and the base station 110 may transmit multiple type 1 SSBs toward the RIS 710 on the first Tx beam in an SS burst.

In some aspects, the base station 110 may transmit multiple type 1 SSBs on each of multiple Tx beams, including the first Tx beam. In this case, the base station 110 may transmit N type 1 SSBs on each Tx beam of the multiple Tx beams. For example, the multiple Tx beams may be all or a subset of Tx beams of the base station 110. In some aspects, the multiple Tx beams may be multiple Tx beams of the base station 110 with directions associated with the RIS 710.

As further shown in FIG. 10, and by reference number 1010, the RIS 710 may reflect the SSBs, transmitted on the first Tx beam by the base station 110, on multiple beams from the RIS 710. In some aspects, the RIS 710 may performing beam sweeping over N beams by reflecting the SSBs in N different directions. For example, the RIS 710 may reflect each SSB, of the N SSBs transmitted on the first Tx beam by the base station 110, on a respective beam associated with a respective reflection direction from the RIS 710.

In some aspects, the base station 110 may transmit multiple SSBs (e.g., N type 1 SSBs) on each of multiple Tx beams. In this case, the RIS 710 may perform beam sweeping for each Tx beam of the base station 110 by reflecting the SSBs transmitted on each Tx beam of the base station 110 on multiple beams from the RIS 710.

In some aspects, the base station 110 may control the RIS 710 to reflect the SSBs on multiple beams from the RIS 710. For example, the base station 110 may control a configuration of the RIS 710, including one or more of scattering, reflection, and refraction characteristics of the RIS 710, to control the RIS 710 to reflect the SSBs on multiple beams from the RIS 710. In some aspects, the RIS 710 may be configured to reflect the SSBs on multiple beams from the RIS 710 based at least in part on the SSBs being transmitted in time and/or frequency resources associated with type 1 SSBs.

As further shown in FIG. 10, and by reference number 1015, the UE 120 may receive one of the SSBs transmitted by the base station 110 and reflected by the RIS 710, and the UE 120 may select a RACH occasion based at least in part on the SSB. In some aspects, the UE 120 may receive an SSB (SSB m) of the N SSBs transmitted on the first Tx beam of the base station 110. The UE 120 may receive the SSB (SSB m) on a corresponding beam (beam m) reflected from the RIS 710. The SSB received by the UE 120 may correspond to the first type of SSB configured for RIS-assisted procedures (e.g., type 1 SSB).

In some aspects, the UE 120 may select a RACH occasion that includes multiple PRACH transmission slots, based at least in part on receiving the type 1 SSB. The RACH occasion may include resources (e.g., time and/or frequency resources) for the UE 120 to use to transmit a PRACH communication for initiating a RACH procedure with the base station 110. As used herein, a "PRACH transmission slot" corresponds to a time and/or frequency resource (or set of time and/or frequency resources) for the UE 120 to transmit a PRACH communication. In some aspects, the UE 120 may select the RACH occasion based on a mapping between RACH occasions and SSB types. For example, the mapping may include a first set of RACH occasions associated with the first SSB type configured for RIS-assisted procedures (e.g., type 1 SSB) and a second set of RACH occasions associated with a second SSB type configured for non-RIS-assisted procedures (e.g., type 0 SSB). In this case, the first set of RACH occasions may each include multiple PRACH transmission slots, and the UE 120 may select a RACH occasion from the first set of RACH occasions.

In some aspects, the UE 120 may select a RACH occasion (e.g., from the first set of RACH occasions) that corresponds to the Tx beam of the base station 110 (e.g., the first Tx beam) used to transmit the SSB received by the UE 120 and/or the reflected beam from the RIS 710 (e.g., beam m) on which the UE 120 received the SSB. In this case, the selected RACH occasion may provide an indication, to the base station 110, of the Tx beam of the base station 110 and/or the reflected beam from the RIS 710 that resulted in the UE 120 receiving the SSB.

As further shown in FIG. 10, and by reference number 1020, the UE 120 may transmit multiple PRACH communications in the RACH occasion. For example, the UE 120 may a PRACH communication in each of the multiple PRACH transmission slots in the RACH occasion. In some aspects, the UE 120 may encode, in the PRACH communication, an indication of the Tx beam of the base station 110 (e.g., the first Tx beam) used to transmit the SSB received by the UE 120 and/or the reflected beam from the RIS 710 (e.g., beam m) on which the SSB was received by the UE 120. For example, the UE 120 may select, based at least in part on receiving a type 1 SSB, a PRACH preamble that indicates the Tx beam of the base station 110 used to transmit the SSB received by the UE 120 and/or the reflected beam from the RIS 710 on which the SSB was received by the UE 120. Additionally, or alternatively, the RACH occasion selected by the UE 120 may provide an indication of the Tx beam of the base station 110 and/or the reflected beam from the RIS 710 that resulted in the UE 120 receiving the SSB, as described above.

The UE 120 may transmit M PRACH communications. In some aspects, the UE 120 may transmit the M PRACH communications using the same Tx beam of the UE 120. For example, the UE 120 may transmit the M PRACH communications using a TX beam that corresponds to an Rx beam of the UE 120 that received the SSB. In some aspects, the M PRACH communications may correspond to M Rx beams of the base station 110 to be used in an Rx beam sweeping procedure by the base station 110. In some aspects, the M PRACH communications transmitted by the UE 120 may correspond to the number of Rx beams to be used in the beam sweeping procedure by the base station 110 multiplied by a number of beams to be reflected by the RIS 710.

In some aspects, the UE 120 may transmit the PRACH communication multiple times on each Tx beam of a plurality of Tx beams of the UE 120. For example, the UE 120 may perform Tx beam sweeping with the PRACH communications instead of using only the Tx beam that corresponds to the Rx beam on which the SSB was received. In this case, the PRACH communication transmitted on each Tx beam of the UE 120 may be repeated a number of times corresponding to the number of Rx beams to be used in the beam sweeping procedure by the base station 110. In some aspects, the PRACH communication transmitted on each TX beam of the UE 120 may also be repeated an additional number of times corresponding to a number of beams to be reflected by the RIS 710.

As further shown in FIG. 10, and by reference number 1025, the RIS 710 may reflect the PRACH communications transmitted by the UE 120. In some aspects, the same configuration of the RIS 710 may be used for uplink communications as for downlink communications. In this case, the RIS 710 may remain at the configuration that resulted in the UE 120 receiving the SSB, and the RIS 710 may reflect each of the PRACH communications based on the configuration of the RIS 710. For example, the configuration of the RIS 710 may be based on the RACH occasion, which may be selected based at least in part on the beam reflected from the RIS 710 on which the SSB was received by the UE 120. In some aspects, the RIS 710 may perform beam sweeping in the uplink direction by reflecting the PRACH communications transmitted by the UE 120 on different beams in different directions from the RIS 710.

As further shown in FIG. 10, and by reference number 1030, the base station 110 may perform Rx beam sweeping using multiple Rx beams of the base station 110 to determine an Rx beam for receiving communications from the UE 120. In some aspects, the UE 120 may perform Rx beam sweeping using multiple Rx beams over the multiple PRACH transmission slots of a RACH occasion associated with associated with an SSB. For example, the RACH occasion may be associated with a type 1 SSB transmitted on the first Tx beam of the base station 110. The RACH occasion may also be associated with a transmission resource in an SS burst, and the transmission resource may correspond to a beam (e.g., beam m) on which the SSB was reflected by the RIS 710.

The base station 110 may monitor the PRACH transmission slots in the RACH occasion using different Rx beams to determine whether a PRACH communication is received on one or more of the Rx beams. In some aspects, the base station 110 may monitor each PRACH transmission slot in the RACH occasion with a respective Rx beam of the base station 110.

The base station 110 may select, from the multiple Rx beams of the base station 110, an Rx beam for receiving uplink communications from the UE 120 via the RIS 710, based at least in part on receiving a PRACH communication on the Rx beam during the beam sweeping. In some aspects, the base station 110 may receive PRACH communications on more than one Rx beams during the beam sweeping. In this case, the base station 110 may select an Rx beam from the multiple Rx beams that received the PRACH communications, for example, based at least in part on a comparison on signal strengths on the Rx beams.

The base station 110 may determine the Tx beam and configuration of the RIS 710 to use for downlink communications with the UE 120 via the RIS 710 based at least in part on an indication encoded in the PRACH communication. For example, the base station 110 may determine the Tx beam and configuration of the RIS 710 to use for downlink communications with the UE 120 based at least in part on the PRACH preamble and/or the RACH occasion in which the PRACH communication is received. In some aspects, the Rx beam selected by the base station 110 for downlink communications with the UE 120 (e.g., the Rx beam on which the PRACH communication is received) may not correspond to the Tx beam (e.g., the first Tx beam) on which the SSB was transmitted by the base station 110.

In a case in which the UE 120 performs Tx beam sweeping with the PRACH communications, the base station 110 may determine the Tx beam for the UE 120 to use for uplink communications with the base station 110 based at least in part on the PRACH transmission slot in which the PRACH communication is received by the base station 110. The base station 110 may provide an indication of the Tx beam for the UE 120 to use for uplink communications, for example in an uplink transmission configuration indicator (TCI) state. In some aspects, the Tx beam for the UE 120 to use for uplink communications may not correspond to the Rx beam of the UE 120 on which the SSB was received.

As described above in connection with FIG. 10, the UE 120 may receive, from the base station 110 and via the RIS 710, an SSB corresponding to a first SSB type configured for RIS-assisted procedures. The UE 120 may select a RACH occasion including multiple PRACH transmission slots based on receiving the SSB corresponding to the first SSB type. The UE 120 may transmit a PRACH communication in the multiple transmission slots, resulting in the UE 120 transmitting multiple PRACH communications. The base station 110 may perform beam sweeping using multiple Rx beams of the base station over the multiple PRACH transmission slots of the RACH occasion. The base station 110 may select, from the multiple receive beams of the base station, a first receive beam for receiving uplink communications from the UE 120 based at least in part on receiving, from the UE 120 and via the RIS 710, a PRACH communication on the first receive beam during beam sweeping. As a result, the base station may receive the PRACH communication from the UE and allow RIS-assisted initial access, even when beam correspondence does not hold in the uplink and downlink directions. This may increase the reliability of RIS-assisted communications, and thus enable RIS-assisted communications to be used in place of additional base stations and/or relay devices, which may reduce power consumption and network complexity of a wireless communication system.

As indicated above, FIG. 10 is provided as an example. Other examples may differ from what is described with respect to FIG. 10.

Figure 11:
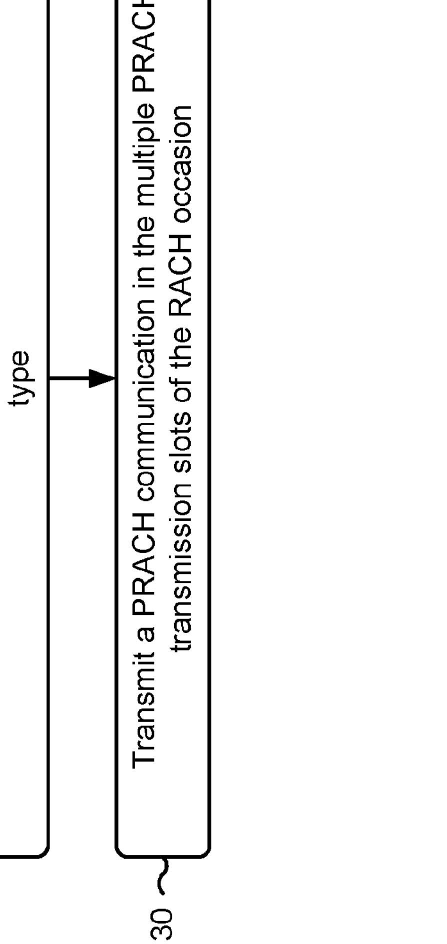
FIGS. 11-12 are diagrams illustrating example processes associated with initial access for RIS-assisted communication, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120) performs operations associated with initial access for RIS-assisted communication.

As shown in FIG. 11, in some aspects, process 1100 may include receiving, from a base station and via a RIS, an SSB corresponding to a first SSB type configured for RIS-assisted procedures (block 1110). For example, the UE (e.g., using reception component 1302, depicted in FIG. 13) may receive, from a base station and via a reconfigurable intelligent surface (RIS), a synchronization signal block (SSB) corresponding to a first SSB type configured for RIS-assisted procedures, as described above.

As further shown in FIG. 11, in some aspects, process 1100 may include selecting a RACH occasion including multiple PRACH transmission slots based at least in part on receiving the SSB corresponding to the first SSB type (block 1120). For example, the UE (e.g., using selection component 1308, depicted in FIG. 13) may select a RACH occasion including multiple PRACH transmission slots based at least in part on receiving the SSB corresponding to the first SSB type, as described above.

As further shown in FIG. 11, in some aspects, process 1100 may include transmitting, to the base station, a PRACH communication in the multiple PRACH transmission slots of the RACH occasion (block 1130). For example, the UE (e.g., using transmission component 1304, depicted in FIG. 13) may transmit, to the base station, a PRACH communication in the multiple PRACH transmission slots of the RACH occasion, as described above.

Process 1100 may include additional aspects, such as any single aspect or any combination of aspects described below and/or in connection with one or more other processes described elsewhere herein.

In a first aspect, receiving the SSB corresponding to the first SSB type comprises receiving the SSB reflected by the RIS on a receive beam of the UE, and wherein transmitting the PRACH communication comprises transmitting the PRACH communication in the multiple PRACH transmission slots of the RACH occasion on a transmit beam of the UE that corresponds to the receive beam of the UE that received the SSB.

In a second aspect, transmitting the PRACH communication comprises transmitting, in the multiple PRACH transmission slots of the RACH occasion, the PRACH communication multiple times on each transmit beam of a plurality of transmit beams of the UE.

In a third aspect, alone or in combination with one or more of the first and second aspects, process 1100 includes selecting, from the plurality of transmit beams of the UE, a transmit beam for transmitting an uplink communication to the base station based at least in part on a determination of which transmit beam transmits the PRACH communication that is received by the base station.

In a fourth aspect, alone or in combination with one or more of the first through third aspects, process 1100 includes selecting, based at least in part on receiving the SSB corresponding to the first SSB type, a PRACH preamble that indicates a transmit beam of the base station used to transmit the SSB received by the UE and a beam from the RIS that reflected the SSB received by the UE, wherein the PRACH communication includes the PRACH preamble.

In a fifth aspect, alone or in combination with one or more of the first through fourth aspects, selecting the RACH occasion comprises selecting the RACH occasion to correspond to a transmit beam of the base station used to transmit the SSB received by the UE and a beam from the RIS that reflected the SSB received by the UE.

In a sixth aspect, alone or in combination with one or more of the first through fifth aspects, selecting the RACH occasion comprises selecting the RACH occasion based at least in part on a mapping between RACH occasions and SSB types.

In a seventh aspect, alone or in combination with one or more of the first through sixth aspects, the mapping includes a first set of RACH occasions associated with the first SSB type and a second set of RACH occasions associated with a second SSB type configured for non-RIS assisted procedures, and wherein selecting the RACH occasion comprises selecting the RACH occasion from the first set of RACH occasions.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
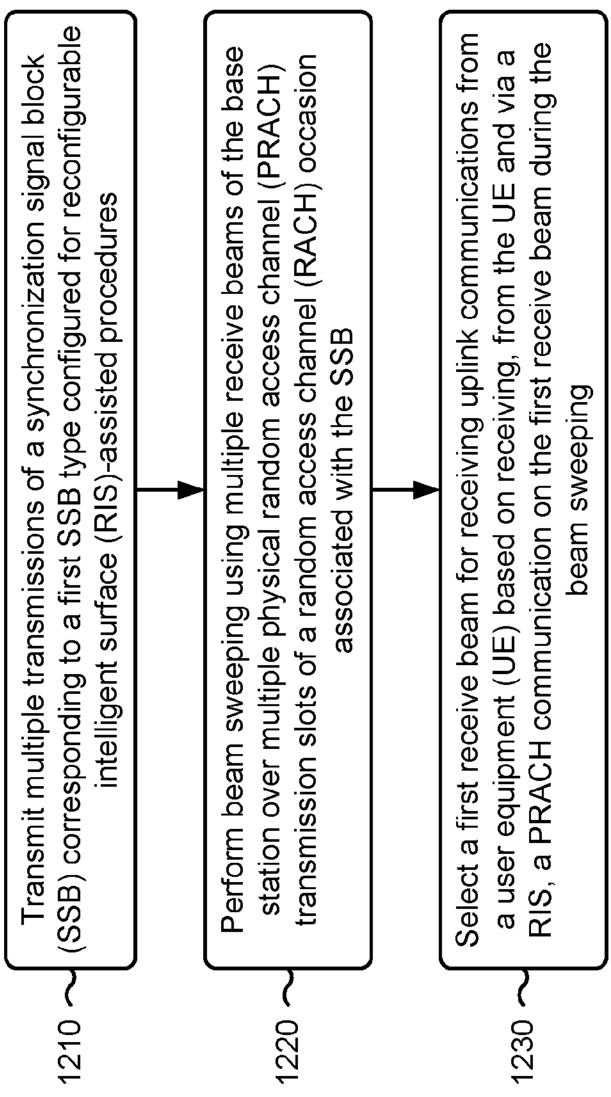

FIG. 12 is a diagram illustrating an example process 1200 performed, for example, by a base station, in accordance with various aspects of the present disclosure. Example process 1200 is an example where the base station (e.g., base station 110) performs operations associated with initial access for RIS-assisted communication.

As shown in FIG. 12, in some aspects, process 1200 may include transmitting, on a first transmit beam of the base station, multiple transmissions of an SSB corresponding to a first SSB type configured for RIS-assisted procedures (block 1210). For example, the base station (e.g., using transmission component 1404, depicted in FIG. 14) may transmit, on a first transmit beam of the base station, multiple transmissions of a synchronization signal block (SSB) corresponding to a first SSB type configured for reconfigurable intelligent surface (RIS)-assisted procedures, as described above.

As further shown in FIG. 12, in some aspects, process 1200 may include performing beam sweeping using multiple receive beams of the base station over multiple PRACH transmission slots of a RACH occasion associated with the SSB (block 1220). For example, the base station (e.g., using beam sweeping component 1408, depicted in FIG. 14) may perform beam sweeping using multiple receive beams of the base station over multiple PRACH transmission slots of a RACH occasion associated with the SSB, as described above.

As further shown in FIG. 12, in some aspects, process 1200 may include selecting, from the multiple receive beams of the base station, a first receive beam for receiving uplink communications from a UE based on receiving, from the UE and via a RIS, a PRACH communication on the first receive beam during the beam sweeping (block 1230). For example, the base station (e.g., using selection component 1410, depicted in FIG. 14) may select, from the multiple receive beams of the base station, a first receive beam for receiving uplink communications from a UE based on receiving, from the UE and via a RIS, a PRACH communication on the first receive beam during the beam sweeping, as described above.

Process 1200 may include additional aspects, such as any single aspect or any combination of aspects described below and/or in connection with one or more other processes described elsewhere herein.

In a first aspect, transmitting the multiple transmissions of the SSB corresponding to the first SSB type comprises transmitting the multiple transmissions of the SSB on the first transmit beam toward the RIS, wherein each of the multiple transmissions of the SSB on the first transmit beam is to be reflected by the RIS using a different beam.

In a second aspect, alone or in combination with the first aspect, transmitting the multiple transmissions of the SSB corresponding to the first SSB type comprises transmitting, on each of the first transmit beam and one or more other transmit beams of the base station, multiple transmissions of the SSB corresponding to the first SSB type.

In a third aspect, alone or in combination with one or more of the first and second aspects, the PRACH communication includes a PRACH preamble that indicates the first transmit beam of the base station and a beam from the RIS associated with a transmission of the SSB, of the multiple transmissions of the SSB, that is received by the UE.

In a fourth aspect, alone or in combination with one or more of the first through third aspects, the RACH occasion during which the PRACH communication is received corresponds to the first transmit beam of the base station and a beam from the RIS associated with a transmission of the SSB, of the multiple transmissions of the SSB, that is received by the UE.

In a fifth aspect, alone or in combination with one or more of the first through fourth aspects, the multiple PRACH transmission slots of the RACH occasion are associated with multiple transmissions of the PRACH communication by the UE, and wherein performing beam sweeping using the multiple receive beams of the base station comprises monitoring each of the multiple PRACH transmission slots using a respective receive beam of the multiple receive beams base station to determine whether the PRACH communication is received on the respective receive beam.

In a sixth aspect, alone or in combination with one or more of the first through fourth aspects, the multiple PRACH transmission slots of the RACH occasion are associated with multiple transmissions of the PRACH communication by the UE and reflected using multiple beams from the RIS.

In a seventh aspect, alone or in combination with one or more of the first through sixth aspects, the first transmit beam corresponds to a first spatial filter of the base station and the first receive beam corresponds to a second spatial filter of the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
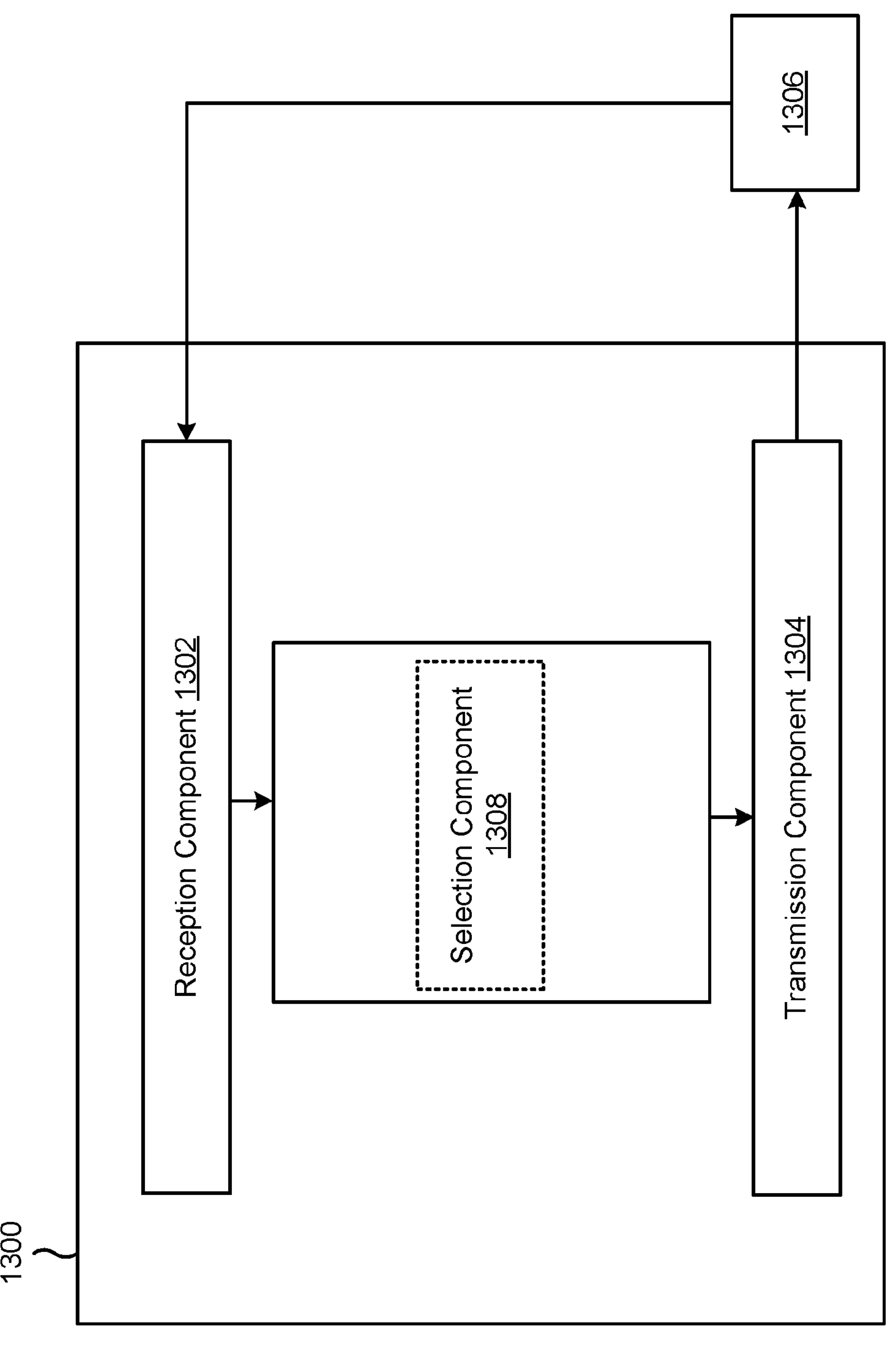
FIGS. 13-14 are block diagrams of example apparatuses for wireless communication, in accordance with various aspects of the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a selection component 1308, among other examples.

In some aspects, the apparatus 1300 may be configured to perform one or more operations described herein in connection with FIG. 10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a base station and via a RIS, an SSB corresponding to a first SSB type configured for RIS-assisted procedures. The selection component 1308 may select a RACH occasion including multiple PRACH transmission slots based at least in part on receiving the SSB corresponding to the first SSB type. The transmission component 1304 may transmit, to the base station, a PRACH communication in the multiple PRACH transmission slots of the RACH occasion.

The selection component 1308 may select, from the plurality of transmit beams of the UE, a transmit beam for transmitting an uplink communication to the base station based at least in part on a determination of which transmit beam transmits the PRACH communication that is received by the base station.

The selection component 1308 may select, based at least in part on receiving the SSB corresponding to the first SSB type, a PRACH preamble that indicates a transmit beam of the base station used to transmit the SSB received by the UE and a beam from the RIS that reflected the SSB received by the UE, wherein the PRACH communication includes the PRACH preamble.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
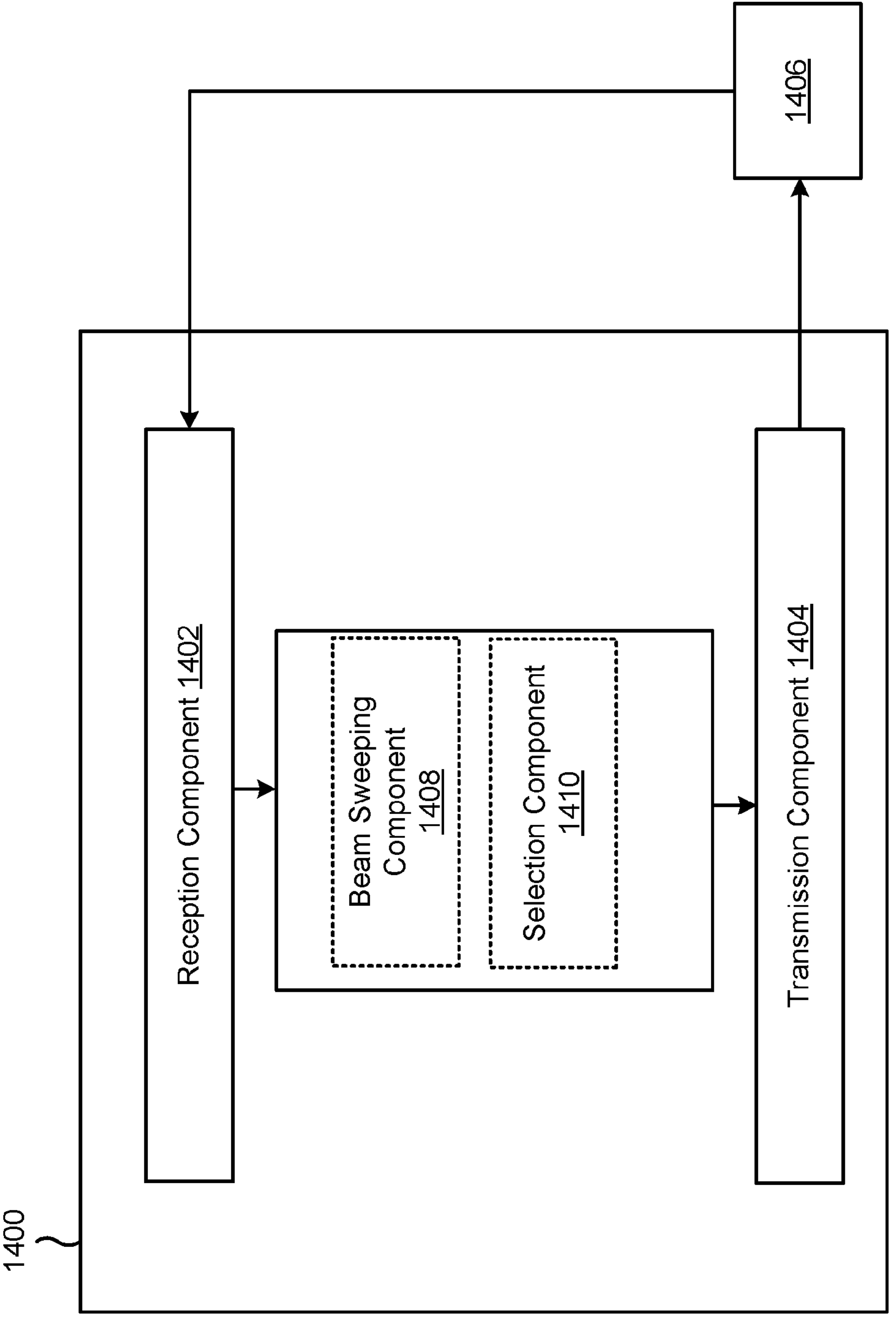

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a beam sweeping component 1408 or a selection component 1410, among other examples.

In some aspects, the apparatus 1400 may be configured to perform one or more operations described herein in connection with FIG. 10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, on a first transmit beam of the base station, multiple transmissions of an SSB corresponding to a first SSB type configured for RIS-assisted procedures. The beam sweeping component 1408 may perform beam sweeping using multiple receive beams of the base station over multiple PRACH transmission slots of a RACH occasion associated with the SSB. The selection component 1410 may select, from the multiple receive beams of the base station, a first receive beam for receiving uplink communications from a UE based on receiving, from the UE and via a RIS, a PRACH communication on the first receive beam during the beam sweeping.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a user equipment (UE), comprising: receiving, from a base station and via a reconfigurable intelligent surface (RIS), a synchronization signal block (SSB) corresponding to a first SSB type configured for RIS-assisted procedures; selecting a random access channel (RACH) occasion including multiple physical random access channel (PRACH) transmission slots based at least in part on receiving the SSB corresponding to the first SSB type; and transmitting, to the base station, a PRACH communication in the multiple PRACH transmission slots of the RACH occasion.

Aspect 2: The method of aspect 1, wherein receiving the SSB corresponding to the first SSB type comprises receiving the SSB reflected by the RIS on a receive beam of the UE, and wherein transmitting the PRACH communication comprises:

transmitting the PRACH communication in the multiple PRACH transmission slots of the RACH occasion on a transmit beam of the UE that corresponds to the receive beam of the UE that received the SSB.

Aspect 3: The method of aspect 1, wherein transmitting the PRACH communication comprises: transmitting, in the multiple PRACH transmission slots of the RACH occasion, the PRACH communication multiple times on each transmit beam of a plurality of transmit beams of the UE.

Aspect 4: The method of aspect 3, further comprising: selecting, from the plurality of transmit beams of the UE, a transmit beam for transmitting an uplink communication to the base station based at least in part on a determination of which transmit beam transmits the PRACH communication that is received by the base station.

Aspect 5: The method of any of aspects 1-4, further comprising: selecting, based at least in part on receiving the SSB corresponding to the first SSB type, a PRACH preamble that indicates a transmit beam of the base station used to transmit the SSB received by the UE and a beam from the RIS that reflected the SSB received by the UE, wherein the PRACH communication includes the PRACH preamble.

Aspect 6: The method of any of aspects 1-5, wherein selecting the RACH occasion comprises: selecting the RACH occasion to correspond to a transmit beam of the base station used to transmit the SSB received by the UE and a beam from the RIS that reflected the SSB received by the UE.

Aspect 7: The method of any of aspects 1-6, wherein selecting the RACH occasion comprises: selecting the RACH occasion based at least in part on a mapping between RACH occasions and SSB types.

Aspect 8: The method of aspect 7, wherein the mapping includes a first set of RACH occasions associated with the first SSB type and a second set of RACH occasions associated with a second SSB type configured for non-RIS assisted procedures, and wherein selecting the RACH occasion comprises: selecting the RACH occasion from the first set of RACH occasions.

Aspect 9: A method of wireless communication performed by abase station, comprising: transmitting, on a first transmit beam of the base station, multiple transmissions of a synchronization signal block (SSB) corresponding to a first SSB type configured for reconfigurable intelligent surface (RIS)-assisted procedures; performing beam sweeping using multiple receive beams of the base station over multiple physical random access channel (PRACH) transmission slots of a random access channel (RACH) occasion associated with the SSB; and selecting, from the multiple receive beams of the base station, a first receive beam for receiving uplink communications from a user equipment (UE) based on receiving, from the UE and via a RIS, a PRACH communication on the first receive beam during the beam sweeping.

Aspect 10: The method of aspect 9, wherein transmitting the multiple transmissions of the SSB corresponding to the first SSB type comprises: transmitting the multiple transmissions of the SSB on the first transmit beam toward the RIS, wherein each of the multiple transmissions of the SSB on the first transmit beam is to be reflected by the RIS using a different beam.

Aspect 11: The method of any of aspects 9-10, wherein transmitting the multiple transmissions of the SSB corresponding to the first SSB type comprises: transmitting, on each of the first transmit beam and one or more other transmit beams of the base station, multiple transmissions of the SSB corresponding to the first SSB type.

Aspect 12: The method of any of aspects 9-11, wherein the PRACH communication includes a PRACH preamble that indicates the first transmit beam of the base station and a beam from the RIS associated with a transmission of the SSB, of the multiple transmissions of the SSB, that is received by the UE.

Aspect 13: The method of any of aspects 9-12, wherein the RACH occasion during which the PRACH communication is received corresponds to the first transmit beam of the base station and a beam from the RIS associated with a transmission of the SSB, of the multiple transmissions of the SSB, that is received by the UE.

Aspect 14: The method of any of aspects 9-13, wherein the multiple PRACH transmission slots of the RACH occasion are associated with multiple transmissions of the PRACH communication by the UE, and wherein performing beam sweeping using the multiple receive beams of the base station comprises: monitoring each of the multiple PRACH transmission slots using a respective receive beam of the multiple receive beams base station to determine whether the PRACH communication is received on the respective receive beam.

Aspect 15: The method of any of aspects 9-13, wherein the multiple PRACH transmission slots of the RACH occasion are associated with multiple transmissions of the PRACH communication by the UE and reflected using multiple beams from the RIS.

Aspect 16: The method of any of aspects 9-15, wherein the first transmit beam corresponds to a first spatial filter of the base station and the first receive beam corresponds to a second spatial filter of the base station.

Aspect 17: An apparatus for wireless communication at a device, comprising a processor; memory coupled with the processor; and instructions stored in the memory and executable by the processor to cause the apparatus to perform the method of one or more aspects of aspects 1-8.

Aspect 18: An apparatus for wireless communication at a device, comprising a processor; memory coupled with the processor; and instructions stored in the memory and executable by the processor to cause the apparatus to perform the method of one or more aspects of aspects 9-16.

Aspect 19: A device for wireless communication, comprising a memory and one or more processors coupled to the memory, the memory and the one or more processors configured to perform the method of one or more aspects of aspects 1-8.

Aspect 20: A device for wireless communication, comprising a memory and one or more processors coupled to the memory, the memory and the one or more processors configured to perform the method of one or more aspects of aspects 9-16

Aspect 21: An apparatus for wireless communication, comprising at least one means for performing the method of one or more aspects of aspects 1-8.

Aspect 22: An apparatus for wireless communication, comprising at least one means for performing the method of one or more aspects of aspects 9-16.

Aspect 23: A non-transitory computer-readable medium storing code for wireless communication, the code comprising instructions executable by a processor to perform the method of one or more aspects of aspects 1-8.

Aspect 24: A non-transitory computer-readable medium storing code for wireless communication, the code comprising instructions executable by a processor to perform the method of one or more aspects of aspects 9-16.

Aspect 25: A non-transitory computer-readable medium storing a set of instructions for wireless communication, the set of instructions comprising one or more instructions that, when executed by one or more processors of a device, cause the device to perform the method of one or more aspects of aspects 1-8.

Aspect 25: A non-transitory computer-readable medium storing a set of instructions for wireless communication, the set of instructions comprising one or more instructions that, when executed by one or more processors of a device, cause the device to perform the method of one or more aspects of aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a network node and via a reconfigurable intelligent surface (RIS), a synchronization signal block (SSB) that is transmitted via a first transmit beam of the network node and that corresponds to a first SSB type configured for RIS-assisted procedures;

selecting a random access channel (RACH) occasion including multiple physical random access channel (PRACH) transmission slots based at least in part on receiving the SSB corresponding to the first SSB type, wherein the RACH occasion corresponds to the first transmit beam used to transmit the SSB and a beam from the RIS that reflected the SSB; and transmitting, to the network node, a PRACH communication in the multiple PRACH transmission slots of the RACH occasion, wherein the PRACH communication is configured to be received based at least in part on beam sweeping using multiple receive beams.

2. The method of claim 1, wherein receiving the SSB corresponding to the first SSB type comprises receiving the SSB reflected by the RIS on a receive beam of the UE, and wherein transmitting the PRACH communication comprises:

transmitting the PRACH communication in the multiple PRACH transmission slots of the RACH occasion on a transmit beam of the UE that corresponds to the receive beam of the UE that received the SSB.

3. The method of claim 1, wherein transmitting the PRACH communication comprises:

transmitting, in the multiple PRACH transmission slots of the RACH occasion, the PRACH communication multiple times on each transmit beam of a plurality of transmit beams of the UE.

4. The method of claim 3, further comprising: selecting, from the plurality of transmit beams of the UE, a transmit beam for transmitting an uplink communication to the network node based at least in part on a determination of which transmit beam transmits the PRACH communication that is received by the network node.

5. The method of claim 1, further comprising: selecting, based at least in part on receiving the SSB corresponding to the first SSB type, a PRACH preamble that indicates the first transmit beam of the network node used to transmit the SSB received by the UE and a beam from the RIS that reflected the SSB received by the UE, wherein the PRACH communication includes the PRACH preamble.

6. The method of claim 1, wherein selecting the RACH occasion comprises:

selecting the RACH occasion based at least in part on a mapping between RACH occasions and SSB types.

7. The method of claim 6, wherein the mapping includes a first set of RACH occasions associated with the first SSB type and a second set of RACH occasions associated with a second SSB type configured for non-RIS assisted procedures, and wherein selecting the RACH occasion comprises:

selecting the RACH occasion from the first set of RACH occasions.

8. A method of wireless communication performed by a network node, comprising:

transmitting, on a first transmit beam of the network node, multiple transmissions of a synchronization signal block (SSB) corresponding to a first SSB type configured for reconfigurable intelligent surface (RIS)-assisted procedures;

performing beam sweeping using multiple receive beams of the network node over multiple physical random access channel (PRACH) transmission slots of a random access channel (RACH) occasion associated with the SSB; and selecting, from the multiple receive beams of the network node, a first receive beam for receiving uplink communications from a user equipment (UE) based on receiving, from the UE and via a RIS, a PRACH communication on the first receive beam during the beam sweeping, wherein the RACH occasion during which the PRACH is received corresponds to the first transmit beam and a beam from the RIS associated with a transmission of the SSB.

9. The method of claim 8, wherein transmitting the multiple transmissions of the SSB corresponding to the first SSB type comprises:

transmitting the multiple transmissions of the SSB on the first transmit beam toward the RIS, wherein each of the multiple transmissions of the SSB on the first transmit beam is to be reflected by the RIS using a different beam.

10. The method of claim 8, wherein transmitting the multiple transmissions of the SSB corresponding to the first SSB type comprises:

transmitting, on each of the first transmit beam and one or more other transmit beams of the network node, multiple transmissions of the SSB corresponding to the first SSB type.

11. The method of claim 8, wherein the PRACH communication includes a PRACH preamble that indicates the first transmit beam of the network node and a beam from the RIS associated with a transmission of the SSB, of the multiple transmissions of the SSB, that is received by the UE.

12. The method of claim 8, wherein the multiple PRACH transmission slots of the RACH occasion are associated with multiple transmissions of the PRACH communication by the UE, and wherein performing beam sweeping using the multiple receive beams of the network node comprises:

monitoring each of the multiple PRACH transmission slots using a respective receive beam of the multiple receive beams of the network node to determine whether the PRACH communication is received on the respective receive beam.

13. The method of claim 8, wherein the multiple PRACH transmission slots of the RACH occasion are associated with multiple transmissions of the PRACH communication by the UE and reflected using multiple beams from the RIS.

14. The method of claim 8, wherein the first transmit beam corresponds to a first spatial filter of the network node and the first receive beam corresponds to a second spatial filter of the network node.

15. A user equipment (UE) for wireless communication, comprising:

one or more memories; and one or more processors operatively coupled to the one or more memories, the one or more memories and the one or more processors configured to:

receive, from a network node and via a reconfigurable intelligent surface (RIS), a synchronization signal block (SSB) that is transmitted via a first transmit beam of the network node and that corresponds to a first SSB type configured for RIS-assisted procedures;

select a random access channel (RACH) occasion including multiple physical random access channel (PRACH) transmission slots based at least in part on receiving the SSB corresponding to the first SSB type, wherein the RACH occasion corresponds to the first transmit beam used to transmit the SSB and a beam from the RIS that reflected the SSB; and transmit, to the network node, a PRACH communication in the multiple PRACH transmission slots of the RACH occasion, wherein the PRACH communication is configured to be received based at least in part on beam sweeping using multiple receive beams.

16. The UE of claim 15, wherein the one or more processors, when receiving the SSB corresponding to the first SSB type, are configured to receive the SSB reflected by the RIS on a receive beam of the UE, and wherein the one or more processors, when transmitting the PRACH communication, are configured to:

transmit the PRACH communication in the multiple PRACH transmission slots of the RACH occasion on a transmit beam of the UE that corresponds to the receive beam of the UE that received the SSB.

17. The UE of claim 15, wherein the one or more processors, when transmitting the PRACH communication, are configured to:

transmit, in the multiple PRACH transmission slots of the RACH occasion, the PRACH communication multiple times on each transmit beam of a plurality of transmit beams of the UE.

18. The UE of claim 17, wherein the one or more processors are configured to:

select, from the plurality of transmit beams of the UE, a transmit beam for transmitting an uplink communication to the network node based at least in part on a determination of which transmit beam transmits the PRACH communication that is received by the network node.

19. The UE of claim 15, wherein the one or more processors are further configured to:

select, based at least in part on receiving the SSB corresponding to the first SSB type, a PRACH preamble that indicates the first transmit beam of the network node used to transmit the SSB received by the UE and a beam from the RIS that reflected the SSB received by the UE, wherein the PRACH communication includes the PRACH preamble.

20. The UE of claim 15, wherein, the one or more processors, when selecting the RACH occasion, are configured to: select the RACH occasion based at least in part on a mapping between RACH occasions and SSB types.

21. The UE of claim 20, wherein the mapping includes a first set of RACH occasions associated with the first SSB type and a second set of RACH occasions associated with a second SSB type configured for non-RIS assisted procedures, and wherein the one or more processors, when selecting the RACH occasion, are configured to:

select the RACH occasion from the first set of RACH occasions.

22. A network node for wireless communication, comprising:

one or more memories; and one or more processors operatively coupled to the one or more memories, the one or more memories and the one or more processors configured to:

transmit, on a first transmit beam of the network node, multiple transmissions of a synchronization signal block (SSB) corresponding to a first SSB type configured for reconfigurable intelligent surface (RIS)-assisted procedures;

perform beam sweeping using multiple receive beams of the network node over multiple physical random access channel (PRACH) transmission slots of a random access channel (RACH) occasion associated with the SSB; and select, from the multiple receive beams of the network node, a first receive beam for receiving uplink communications from a user equipment (UE) based on receiving, from the UE and via a RIS, a PRACH communication on the first receive beam during the beam sweeping, wherein the RACH occasion during which the PRACH is received corresponds to the first transmit beam and a beam from the RIS associated with a transmission of the SSB.

23. The network node of claim 22, wherein the one or more processors, when transmitting the multiple transmissions of the SSB corresponding to the first SSB type, are configured to:

transmit the multiple transmissions of the SSB on the first transmit beam toward the RIS, wherein each of the multiple transmissions of the SSB on the first transmit beam is to be reflected by the RIS using a different beam.

24. The network node of claim 22, wherein the one or more processors, when transmitting the multiple transmissions of the SSB corresponding to the first SSB type, are configured to:

transmit, on each of the first transmit beam and one or more other transmit beams of the network node, multiple transmissions of the SSB corresponding to the first SSB type.

25. The network node of claim 22, wherein the PRACH communication includes a PRACH preamble that indicates the first transmit beam of the network node and a beam from the RIS associated with a transmission of the SSB, of the multiple transmissions of the SSB, that is received by the UE.

26. The network node of claim 22, wherein the multiple PRACH transmission slots of the RACH occasion are associated with multiple transmissions of the PRACH communication by the UE, and wherein performing beam sweeping using the multiple receive beams of the network node comprises:

monitoring each of the multiple PRACH transmission slots using a respective receive beam of the multiple receive beams of the network node to determine whether the PRACH communication is received on the respective receive beam.

27. The network node of claim 22, wherein the first transmit beam corresponds to a first spatial filter of the network node and the first receive beam corresponds to a second spatial filter of the network node.

28. The network node of claim 22, wherein the multiple PRACH transmission slots of the RACH occasion are associated with multiple transmissions of the PRACH communication by the UE and reflected using multiple beams from the RIS.

* * * * *